(12) United States Patent
Song et al.

(10) Patent No.: US 11,739,956 B2
(45) Date of Patent: Aug. 29, 2023

(54) AIR CONDITIONING APPARATUS

(71) Applicant: LG ELECTRONICS INC., Seoul (KR)

(72) Inventors: Chiwoo Song, Seoul (KR); Yongcheol Sa, Seoul (KR); Ilyoong Shin, Seoul (KR); Jisung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 17/143,328

(22) Filed: Jan. 7, 2021

(65) Prior Publication Data
US 2021/0278095 A1 Sep. 9, 2021

(30) Foreign Application Priority Data
Mar. 4, 2020 (KR) .......................... 10-2020-0027092

(51) Int. Cl.
| | |
|---|---|
| *F24F 3/06* | (2006.01) |
| *F25B 25/00* | (2006.01) |
| *F25B 13/00* | (2006.01) |
| *F25B 41/325* | (2021.01) |

(52) U.S. Cl.
CPC ............... *F24F 3/065* (2013.01); *F25B 13/00* (2013.01); *F25B 25/005* (2013.01);
(Continued)

(58) Field of Classification Search
CPC ......... F24F 3/065; F25B 13/00; F25B 25/005; F25B 2313/006; F25B 2313/007;
(Continued)

(56) References Cited

U.S. PATENT DOCUMENTS 11,339,997 B2 * 5/2022 Song .................. F25B 13/00
11,346,588 B2 * 5/2022 Jung .................. F25B 45/00
(Continued)

FOREIGN PATENT DOCUMENTS

| CN | 102192583 | 9/2011 |
|---|---|---|
| CN | 103940139 | 7/2014 |

(Continued)

OTHER PUBLICATIONS

Chinese Office Action dated Jun. 2, 2022 issued in CN Application No. 202110080300.5.
German Office Action dated Mar. 30, 2023.

*Primary Examiner* — Henry T Crenshaw
(74) *Attorney, Agent, or Firm* — Ked & Associates

(57) ABSTRACT

An air conditioning apparatus is provided that may include an outdoor unit including a compressor and an outdoor heat exchanger and through which a refrigerant is circulated, an indoor unit through which a fluid, such as water is circulated, and at least one heat exchange device including a heat exchanger in which the refrigerant and the fluid are heat-exchanged with each other. The at least one heat exchange device may include a high-pressure guide tube that extends from a high-pressure gas tube of the outdoor unit so as to be connected to a first side of the heat exchanger, a low-pressure guide tube that extends from a low-pressure gas tube of the outdoor unit so as to be combined with the high-pressure guide tube, a liquid guide tube that extends from a liquid tube of the outdoor unit so as to be connected to a second side of the heat exchanger, and a solenoid valve installed in the high-pressure guide tube or the low-pressure guide tube to perform an opening and closing operation so as to allow the refrigerant to flow in a first direction. The high-pressure gas tube and the low-pressure gas tube may be connected to each other by a single gas tube, and when the indoor unit performs a cooling operation or a heating (Continued)

operation, flow of refrigerant in the first direction may be blocked in a state in which power is applied to the solenoid valve.

19 Claims, 11 Drawing Sheets

(52) U.S. Cl.
CPC ...... *F25B 41/325* (2021.01); *F25B 2313/006* (2013.01); *F25B 2313/007* (2013.01); *F25B 2313/0231* (2013.01); *F25B 2313/0272* (2013.01); *F25B 2313/02732* (2013.01); *F25B 2313/02741* (2013.01)

(58) Field of Classification Search
CPC ...... F25B 2313/0231; F25B 2313/0272; F25B 2313/02732
See application file for complete search history.

(56) References Cited

U.S. PATENT DOCUMENTS

| | | | |
|---|---|---|---|
| 11,353,251 B2* | 6/2022 | Jo | F25B 13/00 |
| 11,415,343 B2* | 8/2022 | Song | F25B 6/02 |
| 11,519,645 B2* | 12/2022 | Kim | F25B 25/005 |
| 2014/0260387 A1* | 9/2014 | Takenaka | F24F 11/83 |
| | | | 62/205 |
| 2015/0176864 A1 | 6/2015 | Yamashita et al. | |
| 2015/0338144 A1 | 11/2015 | Richardson | |
| 2016/0146496 A1 | 5/2016 | Yamashita | |

FOREIGN PATENT DOCUMENTS

| | | |
|---|---|---|
| CN | 104296238 | 1/2015 |
| JP | H05-141565 | 6/1993 |
| WO | WO 2017/138059 | 8/2017 |

* cited by examiner

AIR CONDITIONING APPARATUS

CROSS-REFERENCE TO RELATED APPLICATION(S)

The present application claims priority under 35 U.S.C. 119 and 35 U.S.C. 365 to Korean Patent Application No. 10-2020-0027092, filed in Korea on Mar. 4, 2020, which is hereby incorporated by reference in its entirety.

BACKGROUND

1. Field

An air conditioning apparatus is disclosed herein.

2. Background

Air conditioning apparatuses are apparatuses that maintain air within a predetermined space in a most proper state according to a use and purpose thereof. In general, such an air conditioning apparatus includes a compressor, a condenser, an expansion device, and evaporator. Thus, the air conditioning apparatus has a refrigerant cycle in which compression, condensation, expansion, and evaporation processes of a refrigerant are performed to cool or heat a predetermined space.

The predetermined space may be variously provided according to a place in which the air conditioning apparatus is used. For example, the air conditioning apparatus may be used in a home or an office.

When the air conditioning apparatus performs a cooling operation, an outdoor heat exchanger provided in an outdoor unit may serve as a condenser, and an indoor heat exchanger provided in an indoor unit may serve as an evaporator. On the other hand, when the air conditioning apparatus performs a heating operation, the indoor heat exchanger may serve as the condenser, and the outdoor heat exchanger may serve as the evaporator.

In recent years, according to environmental regulations, there is a tendency to limit a type of refrigerant used in an air conditioning apparatus and to reduce an amount of used refrigerant. To reduce an amount of refrigerant to be used, a technique for performing cooling or heating by performing heat-exchange between a refrigerant and a predetermined fluid has been proposed. For example, the predetermined fluid may include water.

An air conditioning apparatus in which cooling or heating is performed through heat-exchange between a refrigerant and water is disclosed in U.S. Patent Pub. No. 2015/0176864 (hereinafter, "related art document"), published Jun. 25, 2015, which is hereby incorporated by reference. The air conditioning apparatus disclosed in the related art document includes an outdoor unit having two tubes, a conversion device that converts the two tubes into three tubes, a heat exchange device connected to the conversion device, a plurality of indoor units connected to the heat exchange device.

The air conditioning apparatus includes a plurality of heat exchangers in which a refrigerant and water are heat-exchanged with each other and two valve devices connected to a refrigerant passage so that each of the heat exchangers operates as an evaporator or a condenser. Thus, in the air conditioning apparatus according to the related art, an operation mode of the heat exchanger is determined through control of the valve device.

However, in the heat exchange device having the three tubes like the related art, to directly connect the heat exchange device to the outdoor unit having the two tubes, a three-tube conversion device have to be provided. That is, as the three-tube heat exchange device according to the related art is not directly connected to the two-tube outdoor unit, compatibility is poor, and additional components and installation costs are required to install the heat exchange device in a specific outdoor unit (two-tube outdoor unit).

BRIEF DESCRIPTION OF THE DRAWINGS

Embodiments will be described in detail with reference to the following drawings in which like reference numerals refer to like elements, and wherein.

DETAILED DESCRIPTION

Figure 1:
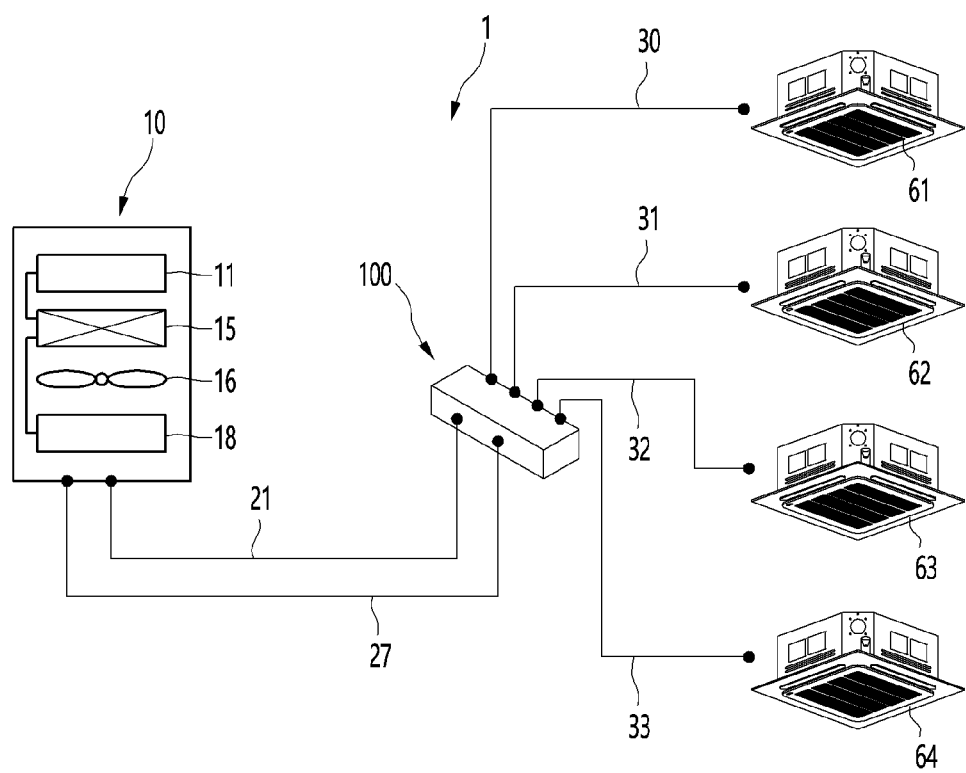
FIG. 1 is a schematic view of an air conditioning apparatus according to an embodiment.

Hereinafter, embodiments will be described with reference to the accompanying drawings. Exemplary embodiments will be described below with reference to the accompanying drawings. It is noted that the same or similar components in the drawings are designated by the same reference numerals as far as possible even if they are shown in different drawings. Further, in description of embodiments, when it is determined that detailed descriptions of well-known configurations or functions disturb understanding of the embodiments, the detailed descriptions will be omitted.

Also, in the description of the embodiments, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
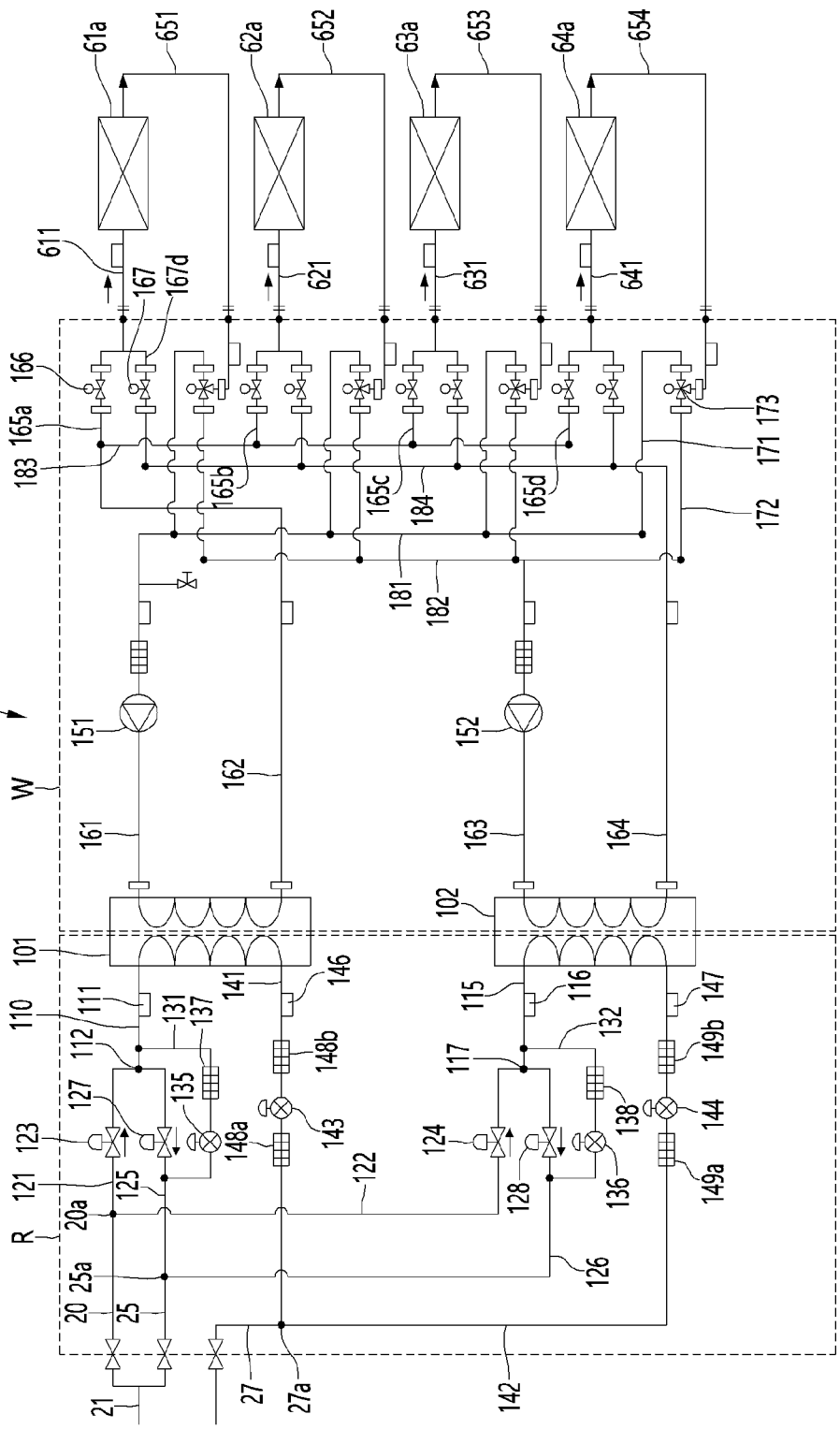
FIG. 2 is a cycle diagram of the air conditioning apparatus according to an embodiment.

FIG. 1 is a schematic view of an air conditioning apparatus according to an embodiment. FIG. 2 is a cycle diagram of the air conditioning apparatus according to an embodiment.

Referring to FIGS. 1 and 2, an air conditioning apparatus 1 according to an embodiment may include an outdoor unit 10, an indoor unit 60, and a heat exchange device 100 connected to the outdoor unit 10 and the indoor unit 60. The outdoor unit 10 and the heat exchange device 100 may be fluidly connected to each other by a first fluid. For example, the first fluid may include a refrigerant. The refrigerant may flow through a refrigerant-side passage of a heat exchanger, which is provided in the heat exchange device 100, and the outdoor unit 10.

The outdoor unit 10 may include a compressor 11 and an outdoor heat exchanger 15. An outdoor fan 16 may be provided at one side of the outdoor heat exchanger 15 to blow external air toward the outdoor heat exchanger 15 so that heat exchange between the external air and the refrigerant of the outdoor heat exchanger 15 is performed. The outdoor unit 10 may further include a main expansion valve 18 (EEV).

The air conditioning apparatus 1 may further include two tubes 21 and 27 connecting the outdoor unit 10 to the heat exchange device 100. The two tubes 21 and 27 may include gas tube 21 through which a high-pressure or low-pressure gas refrigerant flows, and liquid tube 27 through which a liquid refrigerant flows. That is, the outdoor unit 10 and the heat exchange device 100 may have a "two tube connection structure", and the refrigerant may be circulated through the outdoor unit 10 and the heat exchange device 100 by the two connection tubes 21 and 27.

The heat exchange device 100 and the indoor unit 60 may be fluidly connected to each other by a second fluid. For example, the second fluid may include water. The water may flow through a fluid passage of the heat exchanger, which is provided in the heat exchange device 100, and the indoor unit 60.

The heat exchange device 100 may include a plurality of heat exchangers 101 and 102. Each of the heat exchangers 101 and 102 may include, for example, a plate heat exchanger.

The indoor unit 60 may include a plurality of indoor units 61, 62, 62, and 63. The number of plurality of indoor units 61, 62, 63, and 64 is not limited. In FIG. 1, for example, four indoor units 61, 62, 63, and 64 are connected to the heat exchange device 100; however, any number of indoor units may be provided.

The plurality of indoor units 61, 62, 63, and 64 may include first indoor unit 61, second indoor unit 62, third indoor unit 63, and second indoor unit 64. The air conditioning apparatus 1 may further include tubes 30, 31, 33, and 33 that connect the heat exchange device 100 to the indoor unit 60. The tubes 30, 31, 32, and 33 may include first to fourth indoor unit connection tubes 30, 31, 32, and 33, which respectively connect the heat exchange device 100 to the indoor units 61, 62, 63 and 64.

The fluid, such as water may be circulated through the heat exchange device 100 and the indoor unit 60 via the indoor unit connection tubes 30, 31, 32, and 33. If the number of indoor units increases, the number of tubes connecting the heat exchange device 100 to the indoor units may also increase.

According to the above-described components, the refrigerant circulated through the outdoor unit 10 and the heat exchange device 100 and the fluid circulated through the heat exchange device 100 and the indoor unit 60 may be heat-exchanged with each other through heat exchangers 101 and 102 provided in the heat exchange device 100. The fluid cooled or heated through the heat-exchange may be heat-exchanged with indoor heat exchangers 61a, 62a, 63a, and 64a provided in the indoor unit 60 to perform cooling or heating in the indoor space.

In this embodiment, two or more indoor units may be connected to one heat exchanger. Alternatively, one indoor unit may be connected to one heat exchanger. In this case, the plurality of heat exchangers may be provided in the same number as the number of the plurality of indoor units.

Hereinafter, heat exchange device 100 will be described with reference to the drawings.

The heat exchange device 100 may include first and second heat exchangers 101 and 102 which may be fluidly connected to the indoor units 61, 62, 63, and 64, respectively. The first heat exchanger 101 and the second heat exchanger 102 may have a same structure.

Each of the heat exchangers 101 and 102 may include, for example, a plate heat exchanger and may be configured so that the fluid passage and the refrigerant passage are alternately stacked. Each of the heat exchangers 101 and 102 may include the refrigerant passage and the fluid passage.

Each of the refrigerant passages may be fluidly connected to the outdoor unit 10, and the refrigerant discharged from the outdoor unit 10 may be introduced into the refrigerant passage, or the refrigerant passing through the refrigerant passage may be introduced into the outdoor unit 10. Each of the fluid passages may be connected to each of the indoor units 61, 62, 63, and 64, the fluid discharged from each of the indoor units 61, 62, 63, and 64 may be introduced into the fluid passage, and the fluid passing through the fluid passage may be introduced into each of the indoor units 61, 62, 63, and 64.

The heat exchange device 100 may include a switching unit R that adjusts a flow direction and flow rate of the refrigerant introduced into and discharged from the first heat exchanger 101 and the second heat exchanger 102. That is, the switching unit R may include refrigerant tubes 110 and 115 coupled to one or first sides of the heat exchangers 101 and 102 and liquid guide tubes 141 and 142 coupled to the other or second sides of the heat exchanger 101 and 102.

The refrigerant tubes 110 and 115 and the liquid guide tubes 141 and 142 may be connected to a refrigerant passage provided in each of the heat exchangers 101 and 102 so as to be heat-exchanged with the fluid. The refrigerant tubes 110 and 115 and the liquid guide tubes 141 and 142 may guide the refrigerant to pass through the heat exchangers 101 and 102.

That is, the refrigerant tubes 110 and 115 may include first refrigerant tube 110 coupled to one or a first side of the first heat exchanger 101 and a second refrigerant tube 115 coupled to one or a first side of the second heat exchanger 102. The liquid guide tubes 141 and 142 may include a first liquid guide tube 141 coupled to the other or a second side of the first heat exchanger 101 and a second liquid guide tube 142 coupled to the other or a second side of the second heat exchanger 102.

For example, the refrigerant may be circulated through the first heat exchanger 101 by the first refrigerant tube 110 and the first liquid guide tube 141. Also, the refrigerant may be circulated through the second heat exchanger 102 by the second refrigerant tube 115 and the second liquid guide tube 142.

The liquid guide tubes 141 and 142 may be connected to the liquid tube 27. That is, the liquid tube 27 may define a liquid tube branch point 27a branching into the first liquid guide tube 141 and the second liquid guide tube 142. The first liquid guide tube 141 may extend from the liquid tube branch point 27a to the first heat exchanger 101, and the second liquid guide tube 142 may extend from the liquid tube branch point 27a to the second heat exchanger 102.

The air conditioning apparatus 1 may further include gas refrigerant sensors 111 and 116 installed in the refrigerant tubes 110 and 115 and liquid refrigerant sensors 146 and 147 installed in the liquid guide tubes 141 and 142. The gas refrigerant sensors 111 and 116 and the liquid refrigerant sensors 146 and 147 may be referred to as "refrigerant sensors".

The refrigerant sensors may detect a state of the refrigerant flowing through the refrigerant tubes 110 and 115 and the liquid guide tubes 141 and 142. For example, the refrigerant sensors may detect a temperature and pressure of the refrigerant.

The gas refrigerant sensors 111 and 116 may include first gas refrigerant sensor 111 installed in the first refrigerant tube 110 and second gas refrigerant sensor 116 installed in the second refrigerant tube 115. The liquid refrigerant sensors 146 and 147 may include first liquid refrigerant sensor 146 installed in the first liquid guide tube 141 and second liquid refrigerant sensor 147 installed in the second liquid guide tube 142.

The air conditioning apparatus 1 may further include flow valves 143 and 144 installed in the liquid guide tubes 141 and 142. Each of the flow valves 143 and 144 may adjust a flow rate of the refrigerant by adjusting an opening degree thereof. Each of the flow valves 143 and 144 may include an electronic expansion valve (EEV). Also, each of the flow valves 143 and 144 may be adjusted in opening degree to adjust a pressure of the refrigerant passing therethrough.

The electronic expansion valve may reduce a pressure of the refrigerant passing through the expansion valves 143 and 144 by adjusting the opening degree. For example, when the electronic expansion valves 143 and 144 are fully opened (full-open state), the refrigerant may pass without decompression, and when the opening degree of each of the expansion valves 143 and 144 is reduced, the refrigerant may be depressurized. A degree of decompression of the refrigerant may increase as the degree of opening decreases.

The flow valves 143 and 144 may include first flow valve 143 installed in the first liquid guide tube 141 and second flow valve 144 installed in the second liquid guide tube 142.

The air conditioning apparatus 1 may further include strainers 148a, 148b, 149a, and 149b installed on both sides of the flow valves 143 and 144. The strainers 148a, 148b, 149a, and 149b are devices that filter waste from the refrigerant flowing through the liquid guide tubes 141 and 142. For example, the strainers 148a, 148b, 149a, and 149b may be provided as a metal mesh.

The strainers 148a, 148b, 149a, and 149b may include first strainers 148a and 148b installed on the first liquid guide tube 141 and second strainers 149a and 149b installed on the second liquid guide tube 142. The first strainers 148a and 148b may include strainer 148a installed at one or a first side of the first flow valve 143 and a strainer 148b installed at the other or a second side of the first flow valve 143. As a result, even if a flow direction of refrigerant is switched, the waste may be filtered. Likewise, the second strainers 149a and 149b may include strainer 149a installed at one or a first side of the second flow valve 144 and strainer 149b installed at the other or a second side of the second flow valve 144.

The heat exchange device 100 may further include a high-pressure gas tube 20 through which a high-pressure gas refrigerant flows and a low-pressure gas tube 25 through which a low-pressure gas refrigerant flows. The high-pressure gas tube 20 and the low-pressure gas tube 25 may extend from one or a first side of the switching unit R. Also, an end of the high-pressure gas tube 20 and an end of the low-pressure gas tube 25 may be connected to each other so as to be combined to the gas tube 21. For example, a portion or end of the high-pressure gas tube 20 and a portion or end of the low-pressure gas tube 25 may be bundled and connected to the gas tube 21 of the outdoor unit 10.

That is, the refrigerant introduced into the gas tube 21 may selectively flow to one of the high-pressure gas tube 20 or the low-pressure gas tube 25. The refrigerant introduced into the high-pressure gas tube 20 or the low-pressure gas tube 25 may flow to the outdoor unit 10 after being combined with each other at the gas tube 21.

The refrigerant tubes 110 and 115 may be connected to the high-pressure gas tube 20 and the low-pressure gas tube 25. Also, the liquid guide tubes 141 and 142 may be connected to the liquid tube 27.

That is, the refrigerant tubes 110 and 115 may define refrigerant branch points 112 and 117 at one end thereof, respectively. Also, the refrigerant branch points 112 and 117 may be connected so that the high-pressure gas tube 20 and the low-pressure gas tube 25 are combined with each other.

One or a first end of each of the refrigerant tubes 110 and 115 may have refrigerant branch points 112 and 117, and the other or a second end of each of the refrigerant tubes 110 and 115 may be coupled to the refrigerant passages of the heat exchangers 101 and 102.

The switching unit R may further include high-pressure guide tubes 121 and 122 that extend from the high-pressure gas tube 20 to the refrigerant tubes 110 and 115. The high-pressure guide tubes 121 and 122 may connect the high-pressure gas tube 20 to the refrigerant tubes 110 and 115.

The high-pressure guide tubes 121 and 122 may be branched from high-pressure branch point 20a of the high-pressure gas tube 20 to extend to the refrigerant tubes 110 and 115.

That is, the high-pressure guide tubes 121 and 122 may include first high-pressure guide tube 121 that extends from the high-pressure branch point 20a to the first refrigerant tube 110 and second refrigerant guide tube 122 that extends from the second high-pressure branch point 20a to the second refrigerant tube 115.

The first high-pressure guide tube 121 may be connected to the first refrigerant branch point 112, and the second high-pressure guide tube 122 may be connected to the second refrigerant branch point 117. The first high-pressure guide tube 121 may extend from the high-pressure branch point 20a to the first refrigerant branch point 112, and the second high-pressure guide tube 122 may extend from the high-pressure branch point 20a to the second refrigerant branch point 117.

The air conditioning apparatus 1 may further include high-pressure valves 123 and 124 installed in the high-pressure guide tubes 121 and 122. Each of the high-pressure valves 123 and 124 may restrict a flow of the refrigerant to each of the high-pressure guide tubes 121 and 122 through an opening and closing operation thereof. The high-pressure valves 123 and 124 are one-way valves that allow the refrigerant to flow in only one direction. For example, each of the high-pressure valves 123 and 124 may be a solenoid valve.

The high-pressure valves 123 and 124 may include first high-pressure valve 123 installed in the first high-pressure guide tube 121 and second high-pressure valve 124 installed in the second high-pressure guide tube 122. The first high-pressure valve 123 may be installed between the high-pressure branch point 20a and the first refrigerant branch point 112. The second high-pressure valve 124 may be installed between the high-pressure branch point 20a and the second refrigerant branch point 117.

The first high-pressure valve 123 may control a flow of the refrigerant between the high-pressure gas tube 20 and the first refrigerant tube 110. The second high-pressure valve 124 may control a flow of the refrigerant between the high-pressure gas tube 20 and the second refrigerant tube 115.

The switching unit R may further include low-pressure guide tubes 125 and 126 that extend from the low-pressure tube 25 to the refrigerant tubes 110 and 115. The low-pressure guide tubes 125 and 126 may connect the low-pressure tube 25 to the refrigerant tubes 110 and 115.

The low-pressure guide tubes 125 and 126 may be branched from a low-pressure branch point 25a of the low-pressure gas tube 25 to extend to the refrigerant tubes 110 and 115. That is, the low-pressure guide tube 125 and 126 may include first low-pressure guide tube 125 that extends from the low-pressure branch point 25a to the first refrigerant tube 110 and second low-pressure guide tube 126 that extends from the low-pressure branch point 25a to the second low-pressure refrigerant tube 115.

The first low-pressure guide tube 125 may be connected to the first refrigerant branch point 112, and the second low-pressure guide tube 126 may be connected to the second refrigerant branch point 117. The first low-pressure guide tube 125 may extend from the low-pressure branch point 25a to the first refrigerant branch point 112, and the second low-pressure guide tube 126 may extend from the low-pressure branch point 25a to the second refrigerant branch point 117. Thus, the high-pressure guide tubes 121 and 122 and the low-pressure guide tubes 125 and 126 may be combined with each other at the branch points 25a and 117.

The air conditioning apparatus 1 may further include low-pressure valves 127 and 128 installed in the low-pressure guide tubes 126 and 127. Each of the low-pressure valves 127 and 128 may restrict a flow of the refrigerant to each of the low-pressure guide tubes 125 and 126 through an opening and closing operation thereof. The low-pressure valves 127 and 128 are one-way valves that allow the refrigerant to flow in only one direction. For example, each of the low-pressure valves 127 and 128 may be a solenoid valve.

The low-pressure valves 127 and 128 may include first low-pressure valve 127 installed in the first low-pressure guide tube 125 and second low-pressure valve 128 installed in the second low-pressure guide tube 126. The first low-pressure valve 127 may be installed between a point at which the first refrigerant branch point 112 and a first pressure equalization tube 131 described hereinafter are connected to each other. The second low-pressure valve 128 may be installed between a point at which the second refrigerant branch point 117 and a second pressure equalization tube 132 described hereinafter are connected to each other.

The switching unit R may further include the pressure equalization tubes 131 and 132 that branch from the first refrigerant tube 110 to extend to the low-pressure guide tubes 125 and 126. The pressure equalization tubes 131 and 132 may include the first pressure equalization tube 131 branched from one point of the first refrigerant tube 110 to extend to the first low-pressure guide tube 125 and the second pressure equalization tube 132 branching from one point of the second refrigerant tube 115 to extend to the second low-pressure guide tube 126.

Points at which the pressure equalization tubes 131 and 132 and the low-pressure guide tubes 125 and 126 are connected to each other may be disposed between the low-pressure branch point 25a and the low-pressure valves 127 and 128, respectively. That is, the first pressure equalization tube 131 may be branched from the first refrigerant tube 110 to extend to the first low-pressure guide tube 125 disposed between the low-pressure branch point 25a and the first low-pressure valve 127. Similarly, the second pressure equalization tube 132 may be branched from the second refrigerant tube 115 to extend to the second low-pressure guide tube 126 disposed between the low-pressure branch point 25a and the second low-pressure valve 128.

The air conditioning apparatus 1 may further include pressure equalization valves 135 and 136 and pressure equalization strainers 137 and 138, which are installed in the pressure equalization tubes 131 and 132. The pressure equalization valves 135 and 136 may be adjusted in opening degree to bypass the refrigerant in the refrigerant tubes 110 and 115 to the low-pressure guide tubes 125 and 126. Each of the pressure equalization valves 135 and 136 may include an electronic expansion valve (EEV).

The pressure equalization valves 135 and 136 may include first pressure equalization valve 135 installed in the first pressure equalization tube 131 and second pressure equalization valve 136 installed in the second pressure equalization tube 132. The pressure equalization strainers 137 and 138 may include first pressure equalization strainer 137 installed in the first pressure equalization tube 131 and second pressure equalization strainer 138 installed in the second pressure equalization tube 132.

The pressure equalization strainers 137 and 138 may be disposed between the pressure equalization valves 135 and 136 and the refrigerant tubes 110 and 115. Thus, waste in the refrigerant flowing from the refrigerant tubes 110 and 115 to the pressure equalization valves 135 and 136 may be filtered, or foreign substances may be prevented from passing therethrough.

The pressure equalization tubes 131 and 132 and the pressure equalization valves 135 and 136 may be referred to as a "pressure equalization circuit". The pressure equalization circuit may operate to reduce a pressure difference between the high-pressure refrigerant and the low-pressure refrigerant in the refrigerant tubes 110 and 115 when an operation mode of the heat exchangers 101 and 102 is switched.

An operation mode of heat exchangers 101 and 102 may include a condenser mode operating as the condenser and an evaporator mode operating as the evaporator. For example, when the heat exchangers 101 and 102 switch the operation mode from the condenser to the evaporator, the high-pressure valves 123 and 124 may be closed, and the low-pressure valves 127 and 128 may be opened. Conversely, when the heat exchangers 101 and 102 is switched in operation mode from the evaporator to the condenser, the high-pressure valves 123 and 124 may be opened, and the low-pressure valves 127 and 128 may be closed.

Adjustment of the opening degree of each of the pressure equalization valves 135 and 136 may be performed gradually as time elapses. Thus, the opening degree of the high-pressure valves 123 and 124 and the low-pressure valve 127 may also be controlled.

Pressures of the refrigerant tubes 110 and 115 may be lowered by the refrigerant introduced into the pressure equalization tubes 131 and 132. Thus, the pressure equalization valves 135 and 136 may be opened to reduce a pressure difference between the low-pressure guide tubes 125 and 126 and the refrigerant tubes 110 and 115 within a predetermined range, thereby realizing pressure equalization.

The air conditioning apparatus 1 may further include a controller (not shown). The controller (not shown) may control operations of the high-pressure valves 123 and 124, the low-pressure valves 127 and 128, the pressure equalization valves 135 and 136, and the flow valves 143 and 144, which are described, so that the operation mode of the heat exchangers 101 and 102 may be switched according to a heating or cooling mode required in the plurality of indoor units 61, 62, 63, and 64.

The heat exchange device 100 may further include heat exchanger inlet tubes 161 and 163 connected to the fluid passages of the heat exchanger 101 and 102 and heat exchanger discharge outlet tubes 162 and 164. The heat exchanger inlet tubes 161 and 163 may include first heat exchanger inlet tube 161 connected to an inlet of the fluid passage of the first heat exchanger 101 and second heat exchanger inlet tube 163 to be connected to an inlet of the fluid passage of the second heat exchanger 102. The heat exchanger outlet tubes 162 and 164 may include first heat exchanger outlet tube 162 connected to an outlet of the fluid passage of the first heat exchanger 101 and second heat exchanger outlet tube 164 to be connected to an outlet of the fluid passage of the second heat exchanger 102.

A first pump 151 may be provided in the first heat exchanger inlet tube 161, and a second pump 152 may be provided in the second heat exchanger inlet tube 163.

A first combination tube 181 may be connected to the first heat exchanger inlet tube 161. A second combination tube 182 may be connected to the second heat exchanger inlet tube 163. A third combination tube 183 may be connected to the first heat exchanger outlet tube 162. A fourth combination tube 184 may be connected to the second heat exchanger outlet tube 164.

A first outlet tube 171 through which fluid discharged from each of the indoor heat exchangers 61a, 62a, 63a, and 64a flows may be connected to the first combination tube 181. A second outlet tube 172 through which fluid discharged from the indoor heat exchangers 61a, 62a, 63a, and 64a flows may be connected to the second combination tube 182.

The first outlet tube 171 and the second outlet tube 172 may be disposed in parallel to each other and be connected to common fluid outlet tubes 651, 652, 653, and 654 communicating with the indoor heat exchangers 61a, 62a, 63a, and 64a. The first outlet tube 171, the second outlet tube 172, and each of the common fluid outlet tubes 651, 652, 653, and 654 may be connected to each other by, for example, a three-way valve 173. Accordingly, the fluid of the common fluid outlet tube 651, 652, 653, and 654 may flow through one of the first outlet tube 171 and the second outlet tube 172 via the three-way valve 173.

The common fluid outlet tubes 651, 652, 653, and 654 may be connected to outlet tubes of the indoor heat exchangers 61a, 62a, 63a, and 64a, respectively. First inlet tubes 165a, 165b, 165c, and 165d through which fluid to be introduced into each indoor heat exchanger 61a, 62a, 63a, and 64a flows may be connected to the third combination tube 183. A second inlet tube 167d through which fluid to be introduced into each of the indoor heat exchangers 61a, 62a, 63a, and 64a flows may be connected to the fourth combination tube 184.

The first inlet tubes 165a, 165b, 165c, and 165d and the second inlet tube 167d may be arranged in parallel to each other and be connected to the common inlet tubes 611, 621, 631, and 641 communicating with the indoor heat exchangers 61a, 62a, 63a, and 64a. Each of the first inlet tubes 165a, 165b, 165c, and 165d may be provided with a first valve 166, and the second inlet tubes 167d may be provided with a second valve 167.

Each of the plurality of indoor units 61, 62, 63 and 64 may function as the evaporator to perform the cooling operation. Alternatively, each of the plurality of indoor units 61, 62, 63, and 64 may function as the condenser to perform the heating operation.

That is, in the air conditioning apparatus 1, the plurality of indoor units 61, 62, 63, and 64 may be switched in operation mode to a cooling mode or a heating mode. The outdoor unit 10 and the heat exchange device 100 have a two-tube connection structure connected by two tubes, that is, the gas tube 21 and the liquid tube 27. The outdoor unit having the two-tube connection structure may be referred to as a "switchable outdoor unit".

Figure 3:
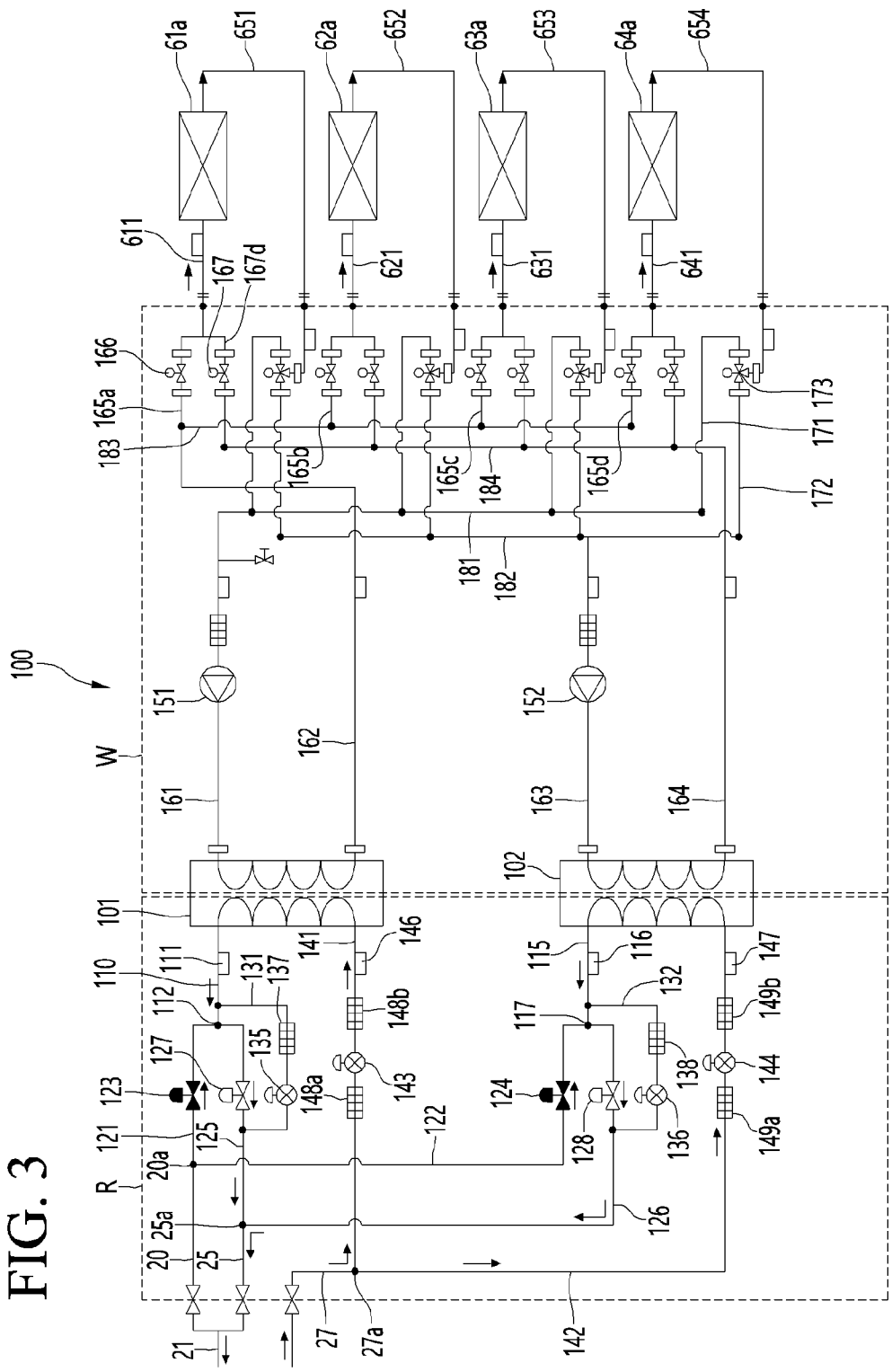
FIG. 3 is a cycle diagram illustrating a flow of refrigerant in a heat exchange device during a cooling operation of the air conditioning apparatus according to an embodiment.

FIG. 3 is a cycle diagram illustrating a flow of refrigerant in a heat exchange device during a cooling operation of the air conditioning apparatus according to an embodiment. Referring to FIG. 3, when the air conditioning apparatus 1 performs the cooling operation (when a number of indoor units perform the cooling operation), a high-pressure liquid refrigerant condensed in the outdoor heat exchanger 15 of the outdoor unit 10 is introduced into the switching unit R through the liquid tube.

A first portion of the refrigerant introduced into the liquid tube 27 is branched at the liquid tube branch point 27a to flow into the first liquid guide tube 141, and a second portion of the refrigerant is branched at the liquid tube branch point 27a to flow into the second liquid guide tube 142. The condensed refrigerant introduced into the first liquid guide tube 141 may be expanded while passing through the first flow valve 143. In addition, the expanded refrigerant may be evaporated by absorbing heat of a fluid, such as water while passing through the first heat exchanger 101.

The evaporated refrigerant discharged from the first heat exchanger 101 may be introduced into the first low-pressure guide tube 125 through the first refrigerant tube 110 to flow to the low-pressure gas tube 25. The first low-pressure valve 127 is opened, and the first high-pressure valve 123 is closed.

The condensed refrigerant introduced into the second liquid guide tube 142 may be expanded while passing through the second flow valve 144. Also, the expanded refrigerant may be evaporated by absorbing heat of a fluid, such as water while passing through the second heat exchanger 102.

The evaporated refrigerant discharged from the second heat exchanger 102 may be introduced into the second low-pressure guide tube 126 through the second refrigerant tube 115 to flow to the low-pressure gas tube 25. The second low-pressure valve 128 is opened, and the second high-pressure valve 124 is closed.

The refrigerant introduced into the low-pressure gas tube 25 may be suctioned into the compressor 11 of the outdoor unit 10 through the gas tube 21. The refrigerant compressed by the compressor 11 may be condensed in the outdoor heat exchanger 15 of the outdoor unit 10. This refrigerant cycle may be repeated.

When the air conditioning apparatus 1 performs the cooling operation, the first high-pressure valve 123 and the second high-pressure valve 124 are in a reverse flow state because an outlet-side pressure is greater than an inlet-side pressure. When power applied to the first high-pressure valve 123 and the second high-pressure valve 124 is shut off and thus turned off, chattering noise may be generated due to an internal pressure difference of the valve.

Thus, in this embodiment, the power may be applied to the first high-pressure valve 123 and the second high-pressure valve 124 in a reverse flow state in which the outlet-side pressure is greater than the inlet-side pressure to block a flow of the refrigerant, thereby minimizing the chattering noise generated due to the internal pressure difference.

Figure 4:
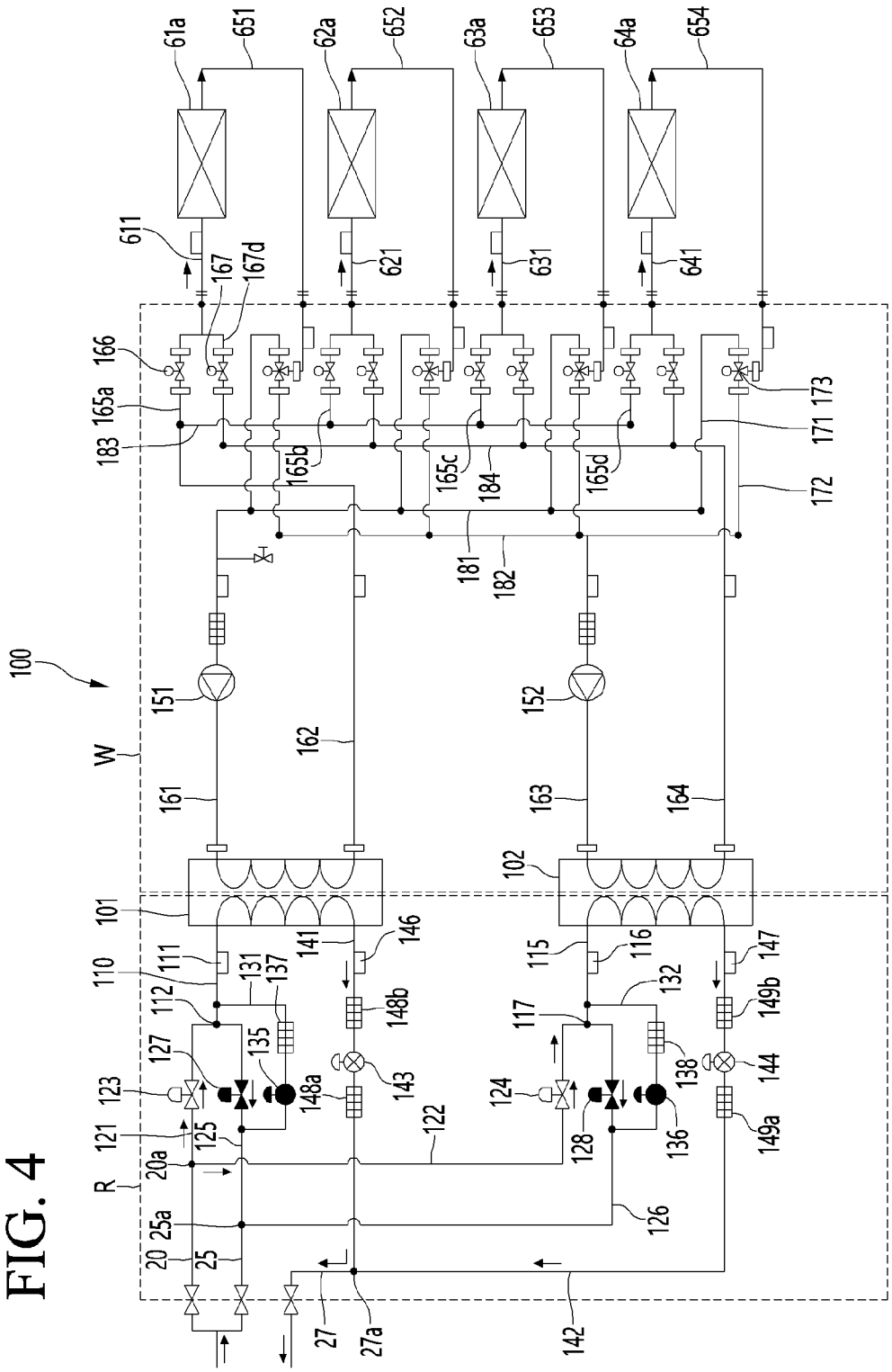
FIG. 4 is a cycle diagram illustrating a flow of the refrigerant in the heat exchange device during a heating operation of the air conditioning apparatus according to an embodiment.

FIG. 4 is a cycle diagram illustrating a flow of refrigerant in the heat exchange device during a heating operation of the air conditioning apparatus according to an embodiment. Referring to FIG. 4, when the air conditioning apparatus 1 performs the cooling operation (when a number of indoor units perform the cooling operation), a high-pressure liquid refrigerant condensed in the outdoor heat exchanger 11 of the outdoor unit 10 is introduced into the switching unit R through the gas tube 21.

The first high-pressure valve 123 and the second high-pressure valve 124 are opened, and the first low-pressure valve 127 and the second low-pressure valve 128 are closed. Also, the first pressure equalization valve 135 and the second pressure equalization valve 136 may be closed. Thus, the refrigerant introduced into the gas tube 21 may be restricted in movement toward the low-pressure gas tube 25 and may move only to the high-pressure gas tube 20.

A first portion of the refrigerant introduced into the high-pressure gas tube 20 is branched at the high-pressure branch point 20a to flow into the first high-pressure guide tube 121, and a second portion of the refrigerant is branched at the high-pressure branch point 20a to flow into the second high-pressure guide tube 122. The compressed refrigerant introduced into the first high-pressure guide tube 121 is condensed while passing through the first heat exchanger 101. Also, the condensed refrigerant flows through the first liquid guide tube 141 to flow to the liquid tube 27.

The compressed refrigerant introduced into the second high-pressure guide tube 122 is condensed while passing through the second heat exchanger 102. Also, the condensed refrigerant flows through the second liquid guide tube 142 to flow to the liquid tube 27.

The condensed refrigerant introduced into the liquid tube 27 may be expanded while passing through main expansion valve 18 of the outdoor unit 10. Also, the expanded refrigerant may be evaporated in the outdoor heat exchanger 15 of the outdoor unit 10 and then suctioned into the compressor 11. This refrigerant cycle may be repeated.

When the air conditioning apparatus 1 performs the heating operation, the first low-pressure valve 127 and the second high-pressure valve 128 are in a reverse flow state because an outlet-side pressure is greater than an inlet-side pressure. When power applied to the first low-pressure valve 127 and the second low-pressure valve 128 is shut off and thus turned off, chattering noise may be generated due to an internal pressure difference of the valve.

Thus, in this embodiment, the power may be applied to the first low-pressure valve 127 and the second low-pressure valve 128 in a reverse flow state in which the outlet-side pressure is greater than the inlet-side pressure to block a flow of the refrigerant, thereby minimizing the chattering noise generated due to the internal pressure difference.

Figure 5:
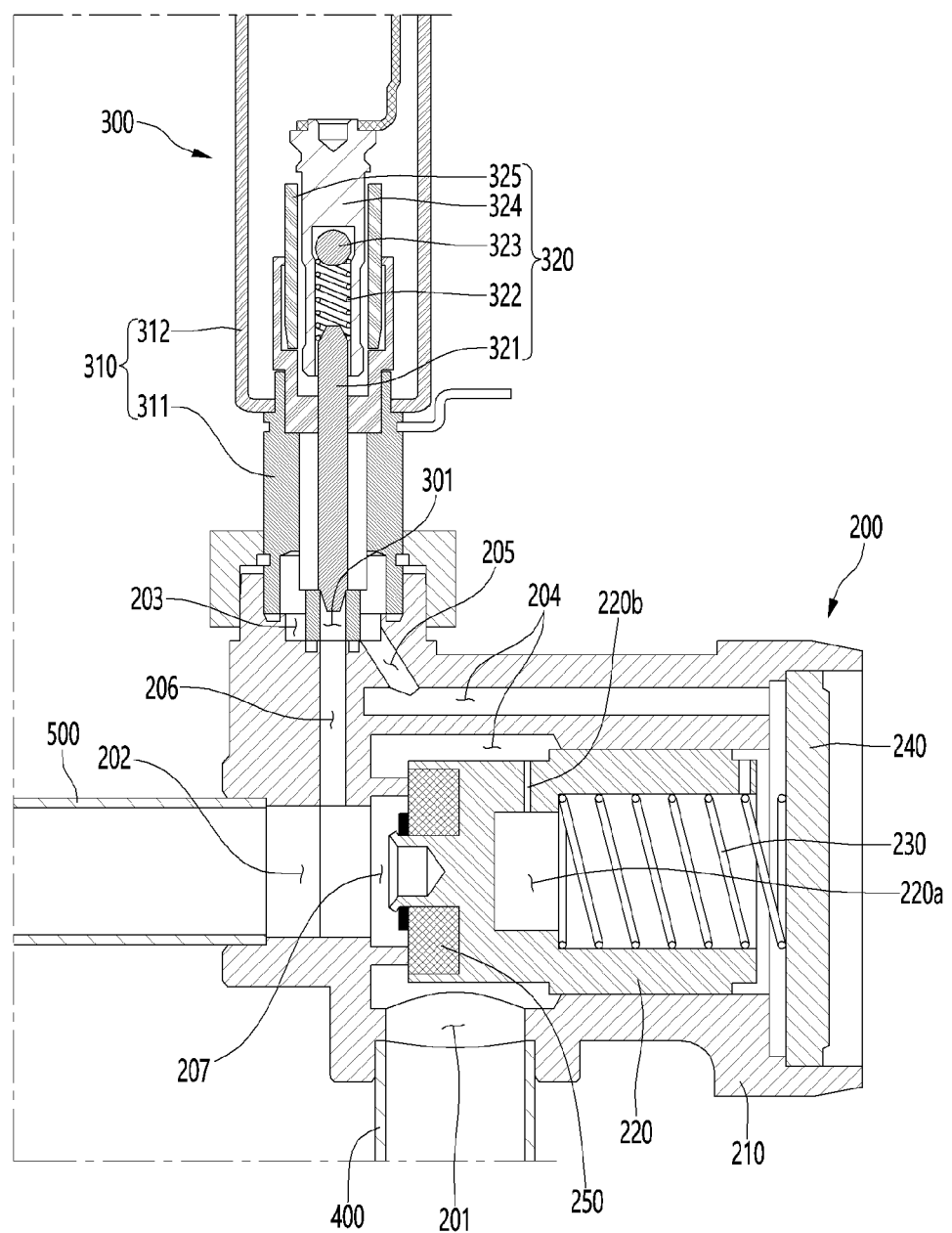
FIG. 5 is a cross-sectional view of a solenoid valve according to an embodiment.

Hereinafter, a solenoid valve according to an embodiment will be described with reference to the accompanying drawings. FIG. 5 is a cross-sectional view of a solenoid valve according to an embodiment.

The solenoid valve described herein may be applied to the high-pressure valves 123 and 124 and/or the low-pressure valves 127 and 128. That is, the solenoid valve may be a one-way valve that allows fluid to flow in only any one direction.

Referring to FIG. 5, solenoid valve 200 according to an embodiment may include a valve body 210. The valve body 210 may include a plurality of through-holes 201, 202, and 203.

The plurality of through-holes 201, 202, and 203 may include first through-hole 201, second through-hole 202, and third through-hole 203. The first through-hole 201 may be a hole through which an external fluid (refrigerant) flows into the valve body 210. An inlet tube 400 through which the fluid flows is inserted to pass through the first through-hole 201.

The second through-hole 202 may be a hole through which the fluid inside the valve body 210 flows to the outside. An outflow tube 500 through which the fluid flows is inserted to pass through the second through-hole 202.

The third through-hole 203 may be a hole that controls an internal pressure of the valve body 210. A pilot device 300 that controls a pressure is inserted to pass through the third through-hole 203.

The valve body 210 further includes a main orifice 207. The main orifice 207 may be understood as a hole that connects the first through-hole 201 to the second through-hole 202. That is, the fluid introduced into the first through-hole 201 may pass through the main orifice 207 to flow to the second through-hole 202.

The solenoid valve 200 may further include a valve shaft 220 disposed inside of the valve body 210 to open or close the main orifice 207, and a valve spring 230 that elastically supports the valve shaft 220. The valve shaft 220 may be provided in a cylindrical shape with an empty inside. A spring chamber 220a in which the valve spring 230 is accommodated may be defined inside of the valve shaft 220.

The valve shaft 220 may have a shape in which one or a first side (left side in the drawing) is closed, and the other or a second side (right side in the drawing) is opened. Also, the valve spring 230 may be coupled to the inside of the valve shaft 220.

The valve shaft 220 may include a shaft head 240. The shaft head 240 may be disposed on the opened surface of the valve shaft 220 to support the valve spring 230. The shaft head 240 may be provided in a disk shape to define one surface of the valve body 210.

At least a portion of the shaft head 240 may be spaced apart from the valve shaft 220. Accordingly, a passage through which fluid flows may be defined between the shaft head 240 and the valve shaft 220.

Also, one or a first end of the valve spring 230 may be supported by the shaft head 240, and the other or a second end may be supported inside of the valve shaft 220. The valve shaft 220 may maintain a state in which the main orifice 207 is shielded by a restoring force of the valve spring 230.

When the valve spring 230 is compressed, the valve shaft 220 may move in a direction (right side in the drawing) to open the main orifice 207. When the main orifice 207 is opened, the fluid may flow through the main orifice 207.

The solenoid valve 200 may further include a packing member 250 coupled to the valve shaft 220. The packing member 250 may be made of an elastic material.

The packing member 250 may be mounted on a first end of the valve shaft 220. The packing member 250 may be disposed to be in close contact with the main orifice 207 connecting the first through-hole 201 to the second through-hole 202.

That is, when the valve shaft 220 moves in a first direction, the packing member 250 may be in close contact with the main orifice 207 to close the main orifice 207, and when the valve shaft 220 moves in a second direction, the packing member 250 is spaced apart from the main orifice 207 to open the main orifice 207.

The solenoid valve 200 may further include a slit passage 220*b*. The slit passage 220*b* may be provided in the valve shaft 220. The slit passage 220*b* may be defined to pass from an outer circumferential surface to an inner circumferential surface of the valve shaft 220.

The slit passage 220*b* may connect inner passage 204 of the valve body 210 to the spring chamber 220*a*. The slit passage 220*b* may be defined at a point between the valve spring 230 and an end of the valve shaft 220. The slit passage 220*b* may have a very small cross-sectional area.

The solenoid valve 200 may further include a first pilot passage 205. The first pilot passage 205 may be provided in an outer circumferential surface of the valve body 210. The first pilot passage 205 may be connected to the inner passage 204.

The first pilot passage 205 may extend from one side of the inner passage 204 toward the pilot device 300 described hereinafter. That is, the first pilot passage 205 may be branched outward from one side of the inner passage 204. The first pilot passage 205 may guide fluid in the inner passage 204 toward the pilot device 300.

The solenoid valve 200 may further include a second pilot passage 206. The second pilot passage 206 may extend from one side of the second through-hole 202 or the third through-hole 203. The second pilot passage 206 may be understood as a passage that connects the second through-hole 202 to the third through-hole 203.

The second pilot passage 206 may connect the second through-hole 202 to an inside of the pilot device 300. When the pilot device 300 is opened, the first pilot passage 205, the inside of the pilot device 300, and the second pilot passage 206 may be connected to each other.

The solenoid valve 200 may further include the pilot device 300. The pilot device 300 may be understood as a device that controls an internal pressure of the solenoid valve 200. The pilot device 300 may be installed to be connected to the third through-hole 203 defined in the valve body 210.

The pilot device 300 may operate to be turned on or off through an electric signal. The main orifice 207 may be opened or closed according to an ON or OFF signal of the pilot device 300. More particularly, the pilot device 300 may include a pilot body 310 having a pilot orifice 301, and an opening/closing device 320 installed inside of the pilot body 310 to selectively open and close the pilot orifice 301.

The pilot body 310 may include a first body 311 provided in a hollow shape, and a second body 312 coupled to the first body 311. The first body 311 may be connected to the valve body 210, and the opening/closing device 320 may be accommodated in the second body 312. A portion of the opening/closing device 320 may protrude into the first body 311.

The pilot orifice 301 may be provided in the first body 311. When the first body 311 is inserted into the third through-hole 203, the pilot orifice 301 and the third through-hole 203 may be connected to each other. Also, the pilot orifice 301 may be connected to the first pilot passage 205 and the second pilot passage 206.

The pilot orifice 301 may be opened or closed according to an operation of the opening/closing device 320. That is, the pilot orifice 301 may be opened or closed through operation of the opening/closing device 320 to selectively connect the first pilot passage 205 to the second pilot passage 206.

The opening/closing device 320 may include a plunger guide 324 disposed inside of the pilot body 310, a coil member 325 wound around an outside of the plunger guide 324 to generate an electromagnetic force, an iron core 323 fixed to an inside of the plunger guide 324, a plunger 321 disposed inside of the plunger guide 324 and installed so as to move forward and backward, and a plunger spring 322 that elastically supports the plunger 321.

The plunger guide 324 may have an inner space and may have a cylindrical shape one or a first side of which may be opened, and the other or second side of which may be closed. The iron core 323 may be fixed to an innermost side of the plunger guide 324, and the plunger spring 322 may be supported on the iron core 323. Also, the plunger 321 may be connected to an end of the plunger spring 322 so as to be elastically supported.

The coil member 325 may surround a portion of an outer circumferential surface of the plunger guide 324. When current or power is applied to the coil member 325, the coil member 325 may be excited to generate an electromagnetic force, and the plunger 321 may move in a direction, in which the pilot orifice 301 is opened, against the elastic force of the plunger spring 322. That is, when power to be applied to the pilot device 300 is turned on, the plunger 321 closing the pilot orifice 301 may move upward to open the pilot orifice 301.

The plunger 321 may be elongated in a vertical direction in the drawing. The plunger 321 may maintain a state in which the pilot orifice 301 is closed by a restoring force of the plunger spring 321. At least a portion of the plunger 321 may be inserted into the pilot orifice 301. However, when power is applied to the pilot device 300, the plunger 321 may move upward to maintain the pilot orifice 301 in an open state. When the pilot orifice 301 is opened, an outlet-side pressure of the valve body 210 and an internal pressure of the valve body 210 may be maintained equally.

Figure 6:
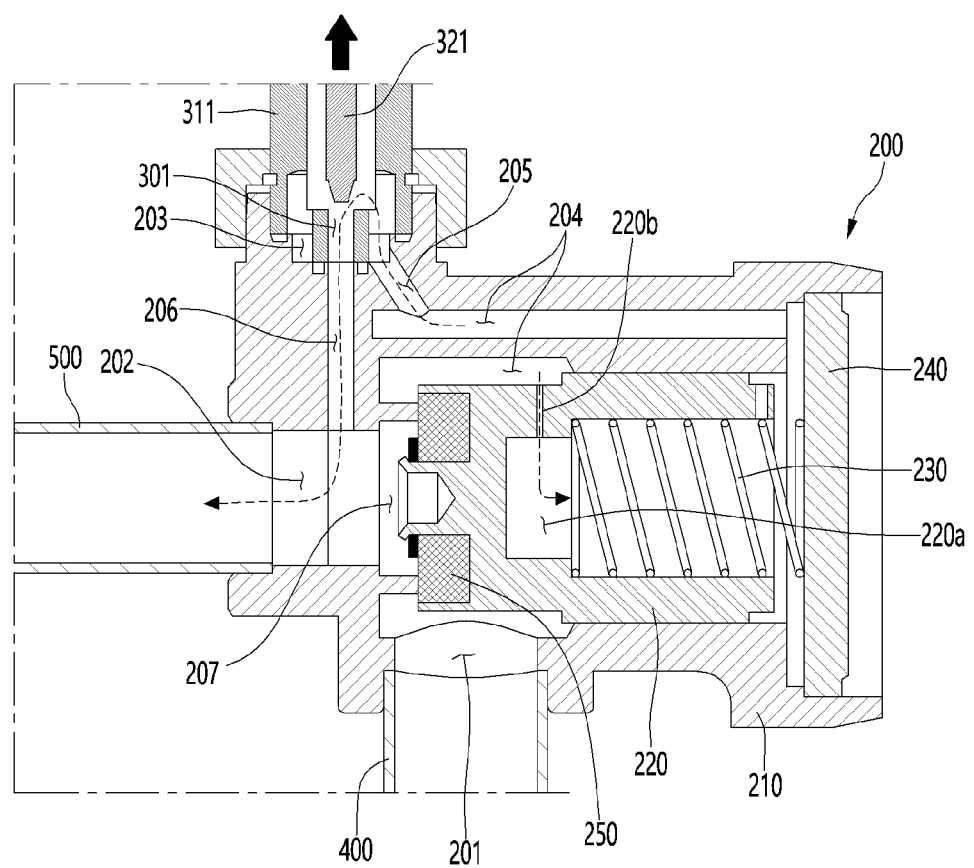
FIG. 6 is a cross-sectional view illustrating a state in which a pilot device is opened in a normal state according to an embodiment.
Figure 7:
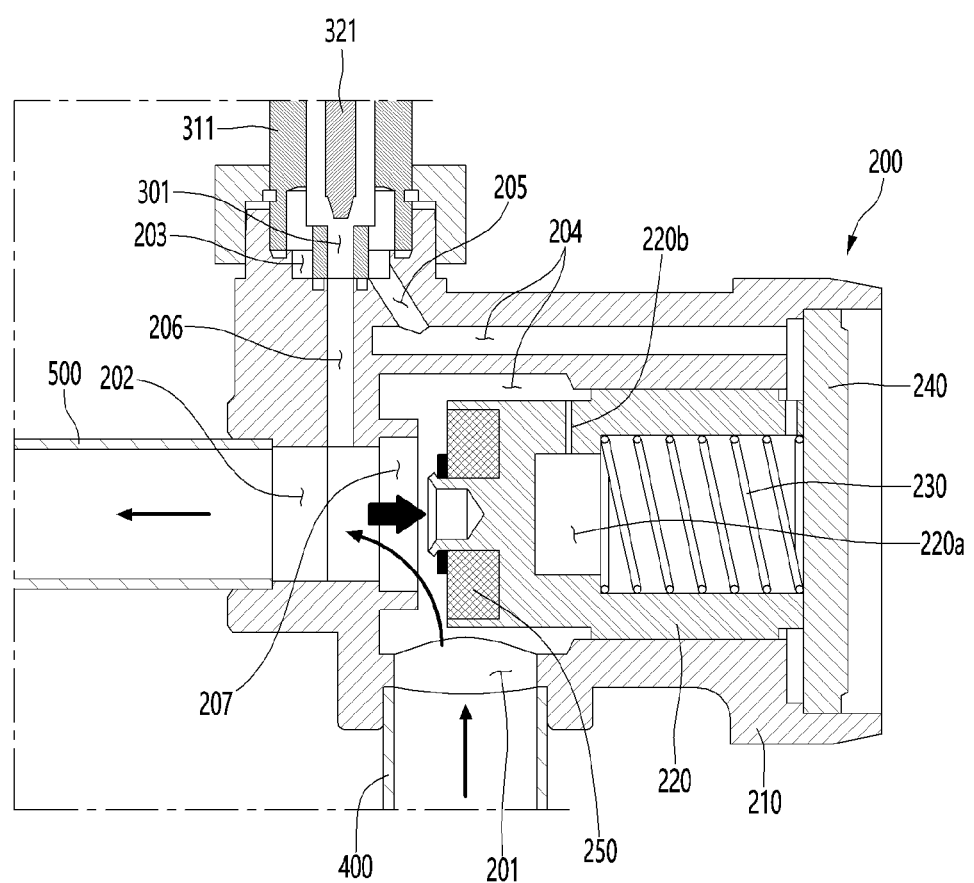
FIG. 7 is a cross-sectional view illustrating a state in which the solenoid valve is opened by opening the pilot device in the normal state according to an embodiment.

FIG. 6 is a cross-sectional view illustrating a state in which a pilot device is opened in a normal state according to an embodiment. FIG. 7 is a cross-sectional view illustrating a state in which the solenoid valve is opened by opening the pilot device in the normal state according to an embodiment.

Herein, the term "normal state" may refer to a state in which an inlet-side pressure of the solenoid valve 200, that is, the inlet tube 400 generates a high pressure, and an outlet-side pressure, that is, the outlet tube 500 generates a low pressure. Conversely, the term "reverse flow state" may refer to a state in which the inlet-side pressure of the solenoid valve 200, that is, the inlet tube 400 generates a low pressure, and the outlet-side pressure, that is, the outlet tube 500 generates a high pressure.

According to one embodiment, in the normal state in which the inlet tube 400 generates the low pressure, and the outlet tube 500 generates the high pressure, when power is applied to the solenoid valve 200 (power on state), current is applied to the coil 325 member to excite the coil member 325, thereby generating an electromagnetic force, and the plunger 321 moves in the direction, in which the pilot orifice 301 is opened, against the elastic force of the plunger spring 322. When the pilot orifice 301 is opened, the internal fluid (refrigerant or air pressure) of the valve body 210 may flow to the outlet tube 500 through the pilot orifice 301 due to a pressure difference therebetween.

That is, the internal pressure and the outlet-side pressure of the solenoid valve 200 may be maintained equally. The internal pressure may be refilled through the slit passage 220b having a relatively small flow cross-sectional area. In this process, the pressure of the spring chamber 220a is lower than the pressure at the outlet-side of the solenoid valve 200. Thus, the pressure applied through the slit passage 220b compresses the valve spring 230 in a direction in which the valve spring 230 is compressed. When the valve spring 230 is compressed, the valve shaft 220 supported by the valve spring 230 may move in the direction in which the main orifice 207 is opened.

As illustrated in FIG. 7, when the main orifice 207 is opened, the fluid of the inlet tube 400 flows into the outlet tube 500 through the main orifice 207. That is, when the solenoid valve (or pilot device) is turned on, the fluid may continuously flow while maintaining the opened state of the main orifice 207.

Figure 8:
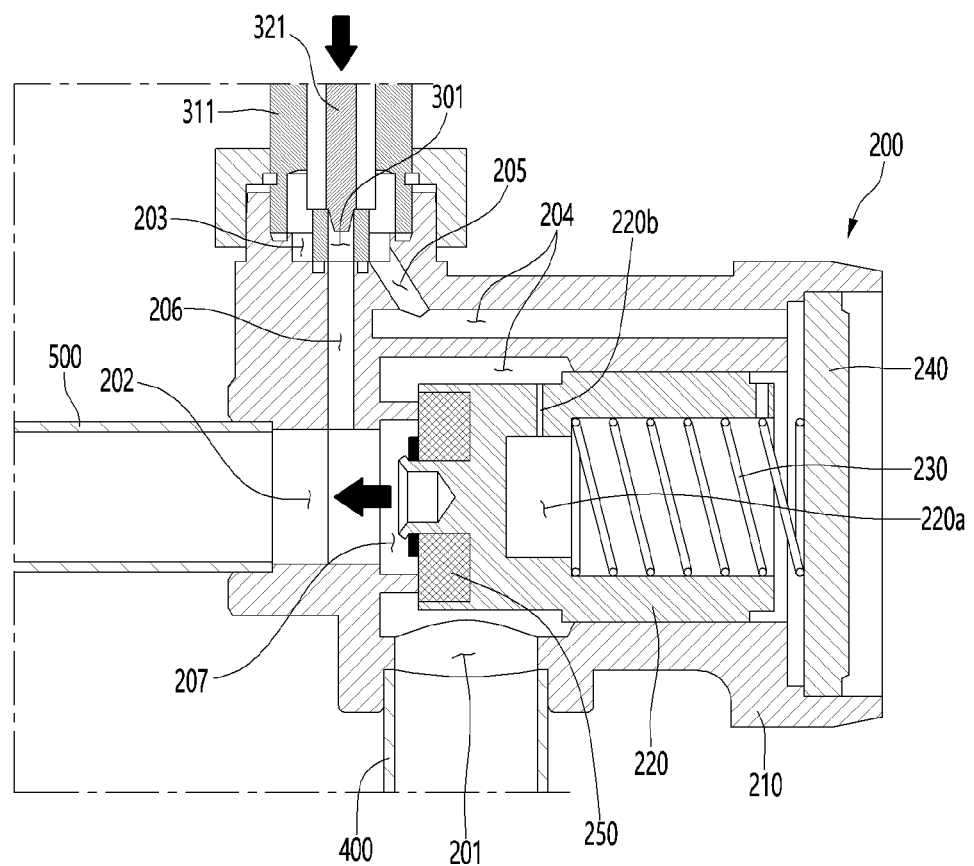
FIG. 8 is a cross-sectional view illustrating a state in which the solenoid valve is closed by closing the pilot device in the normal state according to an embodiment.

FIG. 8 is a cross-sectional view illustrating a state in which the solenoid valve is closed by closing the pilot device in the normal state according to an embodiment. Referring to FIG. 8, in the normal state in which the inlet tube 400 generates the low pressure, and the outlet tube 500 generates the high pressure, when the supply of power to the solenoid valve 200 is cut off (in the power off state), power applied to the coil member 325 is cut off, and accordingly, the plunger 321 moves in a direction, in which the pilot orifice 301 is closed, by the restoring force of the plunger spring 322.

When the pilot orifice 301 is closed, the internal pressure and the inlet-side pressure of the solenoid valve 200 may be maintained equally. Then, the pressure of the spring chamber 220a and the pressure of the inlet-side of the solenoid valve 200 may be the same to restore the compressed valve spring 230.

When the valve spring 230 is restored to its original state, the valve shaft 220 may move in the direction, in which the main orifice 207 is closed, by the restoring force of the valve spring 230.

When the main orifice 207 is closed, the fluid in the inlet tube 400 no longer flows toward the outlet tube 500. That is, when the solenoid valve (or pilot device) is turned off, the main orifice 207 is closed to block the flow of fluid.

In the state in which the solenoid valve 200 is turned off, and the main orifice 207 is closed, when the outlet-side pressure of the solenoid valve 200 is greater than the inlet-side pressure, the chattering noise may occur in the solenoid valve 200. In other words, when an instantaneous pressure at the outlet-side is greater or less than the internal pressure of the spring chamber 220a in the state in which the main orifice 207 is closed, the chattering noise may occur due to vibration of the valve shaft 220 and/or the valve spring 230. Thus, this embodiment proposes a method for minimizing chattering noise while blocking fluid flow in a reverse flow state in which the outlet-side pressure of the solenoid valve is greater than the inlet-side pressure of the solenoid valve.

Figure 9:
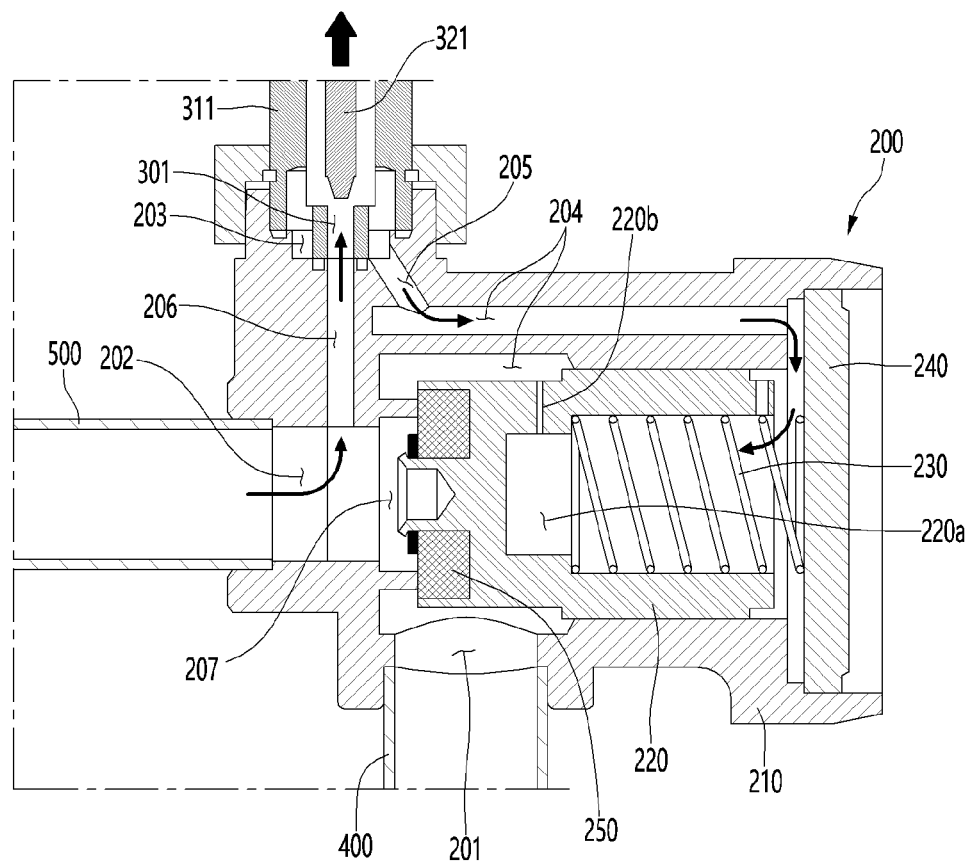
FIG. 9 is a cross-sectional view illustrating a state in which the solenoid valve is closed by opening the pilot device in a reverse flow state according to an embodiment.

FIG. 9 is a cross-sectional view illustrating a state in which the solenoid valve is closed by opening the pilot device in the reverse flow state according to an embodiment. Referring to FIG. 9, in the reverse flow state in which the inlet tube 400 generates the high pressure, and the outlet tube 500 generates the low pressure, power may be applied to the solenoid valve 200 to block the fluid flow while minimizing the chattering noise.

More particularly, when power is applied to the solenoid valve 200 (power on state), current is applied to the coil 325 member to excite the coil member 325, thereby generating an electromagnetic force, and the plunger 321 moves in the direction, in which the pilot orifice 301 is opened, against the elastic force of the plunger spring 322. When the pilot orifice 301 is opened, the fluid pressure of the outlet tube 500 having a relatively high pressure is introduced into the valve body 210 through the pilot orifice 301. Thus, the outlet-side pressure of the valve body 210 and the internal pressure of the valve body 210 may be maintained equally.

Then, the pressure of the spring chamber 220a and the pressure of the inlet-side of the solenoid valve 200 may be the same to maintain tension of the valve spring 230. The chattering noise of the valve spring 230 due to the pressure difference is minimized. Thus, the valve shaft 220 may be continuously maintained to pressurize the pilot orifice 301 in the closing direction.

According to this control method, even in a reverse flow state in which the outlet-side pressure is greater than the inlet-side pressure, the chattering noise may be minimized while blocking the fluid flow.

The above-described solenoid valve 200 may be applied to high-pressure valves 123 and 124 and low-pressure valves 127 and 128 described above. That is, in the air conditioning apparatus 1 having a two-tube connection structure between the outdoor unit 10 and the heat exchange device 100, when the indoor unit performs the cooling operation or the heating operation, power applied to the solenoid valve 200 may be turned on to block the flow of the refrigerant in one direction. In addition, the chattering noise of the valve generated in the reverse flow state may be drastically reduced.

Figure 10:
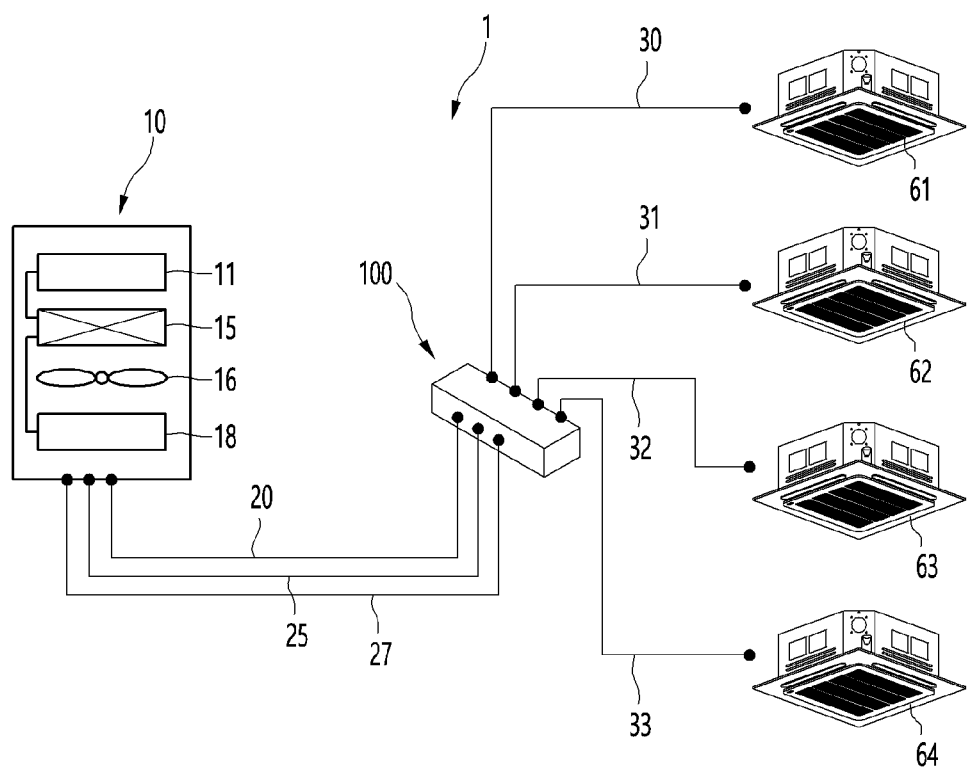
FIG. 10 is a schematic view of an air conditioning apparatus according to another embodiment.
Figure 11:
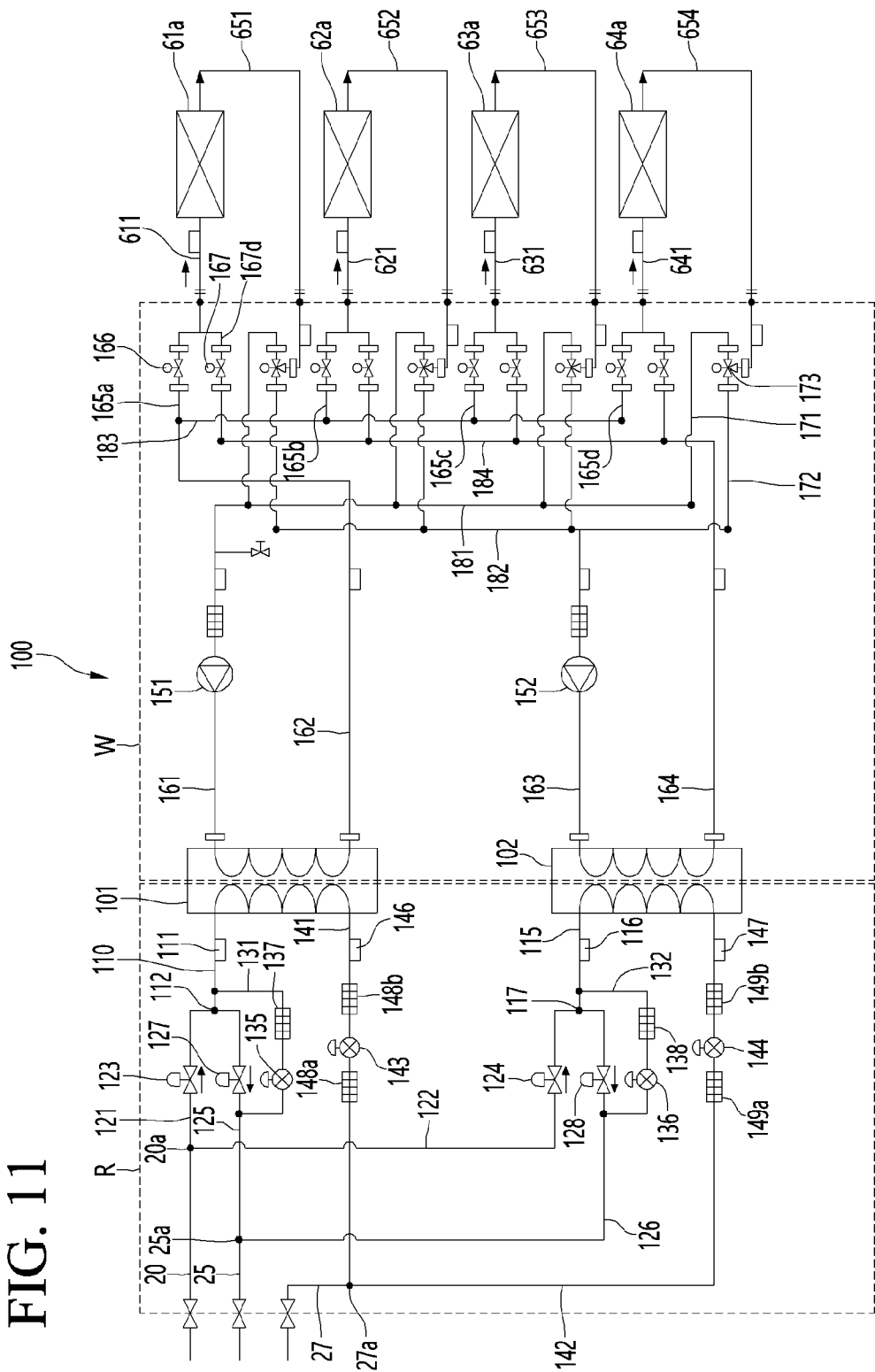
FIG. 11 is a cycle diagram of the air conditioning apparatus according to another embodiment.

FIG. 10 is a schematic view of an air conditioning apparatus according to another embodiment. FIG. 11 is a cycle diagram of the air conditioning apparatus according to another embodiment.

This embodiment is the same as the above-described embodiment except for the number of tubes that connect the outdoor unit to the heat exchange device. Thus, only distinguishing components of this current embodiment will be principally described, and description of the same or similar components as that of the previous embodiment has been omitted.

Referring to FIGS. 10 and 11, air conditioning apparatus 1a according to this embodiment may include outdoor unit 10, indoor unit 60, and heat exchange device 100 connected to the outdoor unit 10 and the indoor unit 60. The outdoor unit 10 and the heat exchange device 100 may be fluidly connected to each other by a first fluid. For example, the first fluid may include a refrigerant.

The refrigerant may flow through a refrigerant-side passage of a heat exchanger, which is provided in the heat exchange device 100, and the outdoor unit 10. The outdoor unit 10 may include compressor 11 and outdoor heat exchanger 15. Outdoor fan 16 may be provided at one side of the outdoor heat exchanger 15 to blow external air toward the outdoor heat exchanger 15 so that heat exchange between the external air and the refrigerant of the outdoor heat exchanger 15 is performed. The outdoor unit 10 may further include main expansion valve 18 (EEV).

The air conditioning apparatus 1 may further include three tubes 20, 25, and 27 that connect the outdoor unit 10 to the heat exchange device 100.

The three tubes 20, 25, and 27 may include high-pressure gas tube 20 through which a high-pressure gas refrigerant flows, low-pressure gas tube 25 through which a low-pressure gas refrigerant flows, and liquid tube 27 through which a liquid refrigerant flows. That is, the outdoor unit 10 and the heat exchange device 100 may have a "three tube connection structure", and the refrigerant may be circulated through the outdoor unit 10 and the heat exchange device 100 by the three connection tubes 20, 25, and 27.

The heat exchange device 100 and the indoor unit 60 may be fluidly connected to each other by a second fluid. For example, the second fluid may include water. The second fluid may flow through a fluid passage of the heat exchanger, which is provided in the heat exchange device 100, and the indoor unit 60.

The heat exchange device 100 may include a plurality of heat exchangers 101 and 102. Each of the heat exchangers 101 and 102 may include, for example, a plate heat exchanger.

The indoor unit 60 may include a plurality of indoor units 61, 62, 62, and 63. In this embodiment, the number of plurality of indoor units 61, 62, 63, and 64 is four; however, the number of indoor units is not limited. In FIG. 9, four indoor units 61, 62, 63, and 64 are shown connected to the heat exchange device 100. The plurality of indoor units 61, 62, 63, and 64 may include first indoor unit 61, second indoor unit 62, third indoor unit 63, and second indoor unit 64.

The air conditioning apparatus 1a may further include tubes 30, 31, 33, and 33 that connect the heat exchange device 100 to the indoor unit 60. The tubes 30, 31, 32, and 33 may include first to fourth indoor unit connection tubes 30, 31, 32, and 33, which respectively connect the heat exchange device 100 to the indoor units 61, 62, 63 and 64.

The fluid may be circulated through the heat exchange device 100 and the indoor unit 60 via the indoor unit connection tubes 30, 31, 32, and 33. As the number of indoor units increases, the number of tubes connecting the heat exchange device 100 to the indoor units may also increase.

According to the above-described components, the refrigerant circulated through the outdoor unit 10 and the heat exchange device 100 and fluid, such as water circulated through the heat exchange device 100 and the indoor unit 60 may be heat-exchanged with each other through the heat exchangers 101 and 102 provided in the heat exchange device 100. The fluid cooled or heated through the heat-exchange may be heat-exchanged with indoor heat exchangers 61a, 62a, 63a, and 64a provided in the indoor unit 60 to perform cooling or heating in the indoor space.

The heat exchange device 100 may be the same as the heat exchange device of FIG. 2 described above. Therefore, detailed description of the heat exchange device 100 has been omitted.

An operation in which all operation modes of the plurality of indoor units 61, 62, 63 and 64 are the same may be referred to as an "exclusive operation". A dedicated operation may be understood as a case in which the indoor heat exchangers 61a, 62a, 63a, and 64a of the plurality of indoor units 61, 62, 63, and 64 operate only as evaporators or as condensers. The plurality of indoor heat exchangers 61a, 62a, 63a, and 64a may be based on an operating (ON) heat exchanger rather than a stopped (OFF) heat exchanger.

Also, operations of the plurality of indoor units 61, 62, 63, 64 in different operation modes may be referred to as a "simultaneous operation". The simultaneous operation may be understood as a case in which some of the plurality of indoor heat exchangers 61a, 62a, 63a, and 64a operate as a condenser, and the remaining indoor heat exchangers operate as an evaporator.

That is, the air conditioning apparatus 1a may perform the simultaneous operation of the plurality of indoor units 61, 62, 63, and 64 in different operating modes. The outdoor unit 10 and the heat exchange device 100 have a three-tube connection structure connected to three tubes, that is, high-pressure tube 20, low-pressure tube 25, and liquid tube 27. The outdoor unit having the three-tube connection structure may be referred to as a "simultaneous outdoor unit".

Referring to FIG. 3, when the air conditioning apparatus 1a performs an exclusive cooling operation (when a number of indoor units perform the cooling operation), a high-pressure liquid refrigerant condensed in the outdoor heat exchanger 15 of the outdoor unit 10 is introduced into the switching unit R through the liquid tube. A first portion of the refrigerant introduced into the liquid tube 27 is branched at the liquid tube branch point 27a to flow into the first liquid guide tube 141, and a second portion of the refrigerant is branched at the liquid tube branch point 27a to flow into the second liquid guide tube 142.

The condensed refrigerant introduced into the first liquid guide tube 141 may be expanded while passing through the first flow valve 143. In addition, the expanded refrigerant may be evaporated by absorbing heat of fluid, such as water while passing through the first heat exchanger 101.

The evaporated refrigerant discharged from the first heat exchanger 101 may be introduced into the first low-pressure guide tube 125 through the first refrigerant tube 110 to flow to the low-pressure gas tube 25. The first low-pressure valve 127 is opened, and the first high-pressure valve 123 is closed.

The condensed refrigerant introduced into the second liquid guide tube 142 may be expanded while passing through the second flow valve 144. Also, the expanded refrigerant may be evaporated by absorbing heat of fluid, such as water while passing through the second heat exchanger 102.

The evaporated refrigerant discharged from the second heat exchanger 102 may be introduced into the second low-pressure guide tube 126 through the second refrigerant tube 115 to flow to the low-pressure gas tube 25. The second low-pressure valve 128 is opened, and the second high-pressure valve 124 is closed.

The refrigerant introduced into the low-pressure gas tube 27 may be suctioned into the compressor 11 of the outdoor unit 10 and then condensed in the outdoor heat exchanger 15 of the outdoor unit 10. This refrigerant cycle may be repeated.

In the case of the air conditioning apparatus 1a having the three-tube connection structure between the outdoor unit 10 and the heat exchange device 100 as described above, the first high-pressure valve 123 and the second high-pressure valve 124 are closed during the cooling operation of the indoor unit. However, in this case, in the first high-pressure valve 123 and the second high-pressure valve 124, as a pressure of an inlet-side tube is greater than that of an outlet-side tube (in a normal state), chattering noise due to an OFF operation of the solenoid valve may not occur.

Therefore, in this case, an off signal may be applied to the solenoid valve to block the flow of fluid.

For another example, when the air conditioning apparatus 1a performs the simultaneous operation (some of the plurality of indoor units perform the cooling operation, and the remaining indoor units perform the heating operation), the high-temperature gas refrigerant compressed in the compressors 10 and 11 is introduced into the switching unit R through the high-pressure gas tube 20. The refrigerant introduced into the high-pressure gas tube 20 is introduced into the first refrigerant tube 110 through the first high-pressure guide tube 121. The first high-pressure valve 123 is opened, and the first low-pressure valve 127 is closed.

The compressed refrigerant introduced into the first refrigerant tube 110 may be introduced into the first heat exchanger 101 and may be condensed by being heat-exchanged with fluid, such as water. The fluid absorbing heat of the refrigerant may be circulated through the indoor units 61 and 62, which require the heating operation.

The condensed refrigerant passing through the first heat exchanger 101 may flow to the liquid tube branch point 27a through the first liquid guide tube 141. Also, the condensed refrigerant may be branched from the liquid tube branch point 27a to pass through the second flow valve 144 through the second liquid guide tube 142. The second flow valve 144 may operate as an expansion valve that expands the refrigerant by adjusting the opening degree thereof.

The expanded refrigerant passing through the second flow valve 144 may be evaporated by being heat-exchanged with fluid, such as water while passing through the second heat exchanger 102. The fluid cooled by heat exchange with the refrigerant may be circulated through the indoor units 63 and 64 requiring the cooling operation.

The evaporated refrigerant passing through the second heat exchanger 102 may flow to the second low-pressure guide tube 126 through the second refrigerant tube 115. The second low-pressure valve 128 is opened, and the second high-pressure valve 124 is closed. Also, the evaporated refrigerant may be introduced into the low-pressure gas tube 25 and collected into the compressors 110 and 11 of the outdoor unit 10.

During the simultaneous operation of the indoor unit as described above, the second low-pressure valve 127 and the first high-pressure valve 124 are closed. However, in this case, in the second low-pressure valve 127 and the first high-pressure valve 124, since a pressure of an inlet-side tube is greater than a pressure of an outlet-side tube (in the normal state), chattering noise due to an OFF operation of the solenoid valve may not occur. Therefore, in this case, an off signal may be applied to the solenoid valve to block the flow of the fluid.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

An air conditioning apparatus according to embodiments disclosed herein may have at least the following advantages.

First, as the heat exchange device in which the refrigerant and the fluid are heat-exchanged with each other may be applied to both a 2-tube outdoor unit and a 3-tube outdoor unit versatility may be improved. That is, as the heat exchange device is applied to both a simultaneous outdoor unit and a switchable outdoor unit, a cooling operation and a heating operation of the indoor unit may operate at a same time, and the cooling operation or the heating operation may be switchable.

Second, the heat exchange device according to embodiments may be installed in the 2-tube outdoor unit or the 3-tube outdoor unit through a combination of refrigerant-side valves and simple control to minimize installation costs and working time.

Third, when the indoor unit performs the cooling operation or the heating operation in the state in which the heat exchange device is installed in a switchable outdoor unit (2-tube outdoor unit), power may be applied to a valve an outlet-side pressure of which is greater than the inlet-side pressure to block flow of the refrigerant, thereby significantly reducing chattering noise of the valve, which occurs in a reverse flow state.

Embodiments disclosed herein provide an air conditioning apparatus including a heat exchange device capable of being applied to both a two-tube outdoor unit and a three-tube outdoor unit. Embodiments disclosed herein also provide an air conditioning apparatus in which an indoor unit is capable of being switched into a cooling operation or a heating operation and capable of operating in cooling operation and heat operation at the same time.

Embodiments disclosed herein further provide an air conditioning apparatus capable of being applied to both a simultaneous outdoor unit and a switchable outdoor unit through a combination of refrigerant-side valves and simple control. Embodiments disclosed herein furthermore provide an air conditioning apparatus capable of reducing chattering noise due to an opening/closing operation of a valve provided in a heat exchange device.

In one embodiment, an air conditioning apparatus may include an outdoor unit, an indoor unit, and a heat exchange device including a heat exchanger in which refrigerant and a fluid, such as water are heat-exchanged with each other. The heat exchange device may include a high-pressure guide tube that extends from a high-pressure gas tube of the outdoor unit so as to be connected to one or a first side of the heat exchanger; a low-pressure guide tube that extends from a low-pressure gas tube of the outdoor unit so as to be combined with the high-pressure guide tube; a liquid guide tube that extends from a liquid tube of the outdoor unit so as to be connected to the other or a second side of the heat exchanger; and a solenoid valve installed in the high-pressure guide tube or the low-pressure guide tube to perform an opening and closing operation so as to allow the refrigerant to flow in one or a first direction.

The high-pressure gas tube and the low-pressure gas tube may be connected to each other by a single gas tube. When the indoor unit performs a cooling operation or a heating operation, the flow of the refrigerant in the one direction may be blocked in a state in which power is applied to the solenoid valve.

Therefore, as a heat exchange device in which a refrigerant and fluid, such as water are heat-exchanged with each other may be applied to both a 2-tube outdoor unit and a 3-tube outdoor unit, versatility may be improved. In addition, as the heat exchange device is applied to both a simultaneous outdoor unit and a switchable outdoor unit, a cooling operation and a heating operation of the indoor unit operate at the same time, and the cooling operation or the heating operation is switchable. In addition, the heat exchange device may be installed in the 2-tube outdoor unit or the 3-tube outdoor unit through a combination of refrigerant-side valves and simple control to minimize an installation costs and working time.

When the indoor unit performs the cooling operation or the heating operation, an outlet-side pressure of the solenoid valve may be greater than an inlet-side pressure of the solenoid valve. During the cooling operation or the heating operation of the indoor unit, when the power is applied to the solenoid valve, an outlet-side refrigerant of the solenoid valve may flow back into the solenoid valve to close the solenoid valve.

When the heat exchanger is installed in the switchable outdoor unit, noise generated from the refrigerant-side valve may be significantly reduced. The solenoid valve may include a high-pressure valve installed in the high-pressure guide tube, and the high-pressure valve may be configured to generate a refrigerant flow from the gas tube to the heat exchanger. During the cooling operation of the indoor unit, when power of the high-pressure valve is turned on, the high-pressure valve may be closed to block the refrigerant flow from the gas tube to the heat exchanger.

The solenoid valve may include a low-pressure valve installed in the low-pressure guide tube, and the low-pressure valve may be configured to generate a refrigerant flow from the heat exchanger to the gas tube. During the heating operation of the indoor unit, when power of the low-pressure valve is turned on, the low-pressure valve may be closed to block the refrigerant flow from the heat exchanger to the gas tube.

When the indoor unit performs the cooling operation, the power of the high-pressure valve may be turned on to close the high-pressure valve so as to block the refrigerant flow from the gas tube to the heat exchanger, and the power of the low-pressure valve may be turned on to close the low-pressure valve so as to block the refrigerant flow from the heat exchanger to the gas tube-pressure valve so as to block the refrigerant flow from the heat exchanger to the gas tube. When the indoor unit performs the heating operation, the power of the high-pressure valve may be turned on to open the high-pressure valve so as to allow the refrigerant to flow from the gas tube to the heat exchanger, and the power of the low-pressure valve may be turned on to open the low-pressure valve so as to allow the refrigerant to flow from the heat exchanger to the gas tube.

The solenoid valve may include a valve body including a first through-hole, through which the refrigerant may be introduced, a second through-hole, through which the refrigerant may be discharged, and a main orifice configured to connect the first through-hole to the second through-hole; a valve shaft disposed inside of the valve body to selectively open or close the main orifice; a valve spring disposed inside of the valve shaft to elastically support the valve shaft; and a pilot device connected to the valve body, the pilot device being configured to perform an opening and closing operation so as to adjust an internal pressure of the valve body.

The pilot device may include a pilot body including a pilot orifice configured to connect an inside of the valve body to the second through-hole; a plunger guide disposed inside of the pilot body; a coil member wound around an outside of the plunger guide to generate electromagnetic force; an iron core fixed inside of the plunger guide; a plunger disposed inside of the plunger guide so as to be installed to be movable forward and backward; and a plunger spring configured to elastically support the plunger. When power is applied to the solenoid valve, current may be applied to the coil member, and the coil member may be excited to generate the electromagnetic force, and the plunger may move in a direction, in which the pilot orifice is opened, against the elastic force of the plunger spring.

When the indoor unit performs the cooling operation or the heating operation, an outlet-side pressure of the valve body may be greater than an inlet-side pressure of the valve body, and an outlet-side refrigerant of the valve body may flow back into the valve body through the pilot orifice to maintain the valve shaft in a direction in which the main orifice is closed.

Details of one or more embodiments are set forth in the accompanying drawings and the description. Other features will be apparent from the description and drawings, and from the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning apparatus, comprising:
    an outdoor unit comprising a compressor and an outdoor heat exchanger and through which a refrigerant is circulated;
    an indoor unit through which a fluid is circulated; and
    a heat exchange device comprising at least one heat exchanger in which the refrigerant and the fluid are heat-exchanged with each other, wherein the at least one heat exchange device comprises:
        a high-pressure guide tube that extends from a high-pressure gas tube of the outdoor unit so as to be connected to a first side of the at least one heat exchanger;
        a low-pressure guide tube that extends from a low-pressure gas tube of the outdoor unit so as to be combined with the high-pressure guide tube;
        a liquid guide tube that extends from a liquid tube of the outdoor unit so as to be connected to a second side of the at least one heat exchanger; and
        a solenoid valve installed in the high-pressure guide tube or the low-pressure guide tube to perform an opening and closing operation so as to allow the refrigerant to flow therethrough, wherein the high-pressure gas tube and the low-pressure gas tube are connected to each other by a single gas tube, and wherein when the indoor unit performs a cooling operation or a heating operation and an outlet-side pressure of the solenoid valve is greater than an inlet-side pressure of the solenoid valve, power is applied to the solenoid valve to block flow of the refrigerant.

2. The air conditioning apparatus according to claim 1, wherein during the cooling operation or the heating operation of the indoor unit, when the power is applied to the solenoid valve, refrigerant at an outlet-side of the solenoid valve flows back into the solenoid valve to close the solenoid valve.

3. The air conditioning apparatus according to claim 1, wherein the solenoid valve comprises a high-pressure valve installed in the high-pressure guide tube, and wherein the high-pressure valve is configured to generate a refrigerant flow from the gas tube to the heat exchanger.

4. The air conditioning apparatus according to claim 3, wherein during the cooling operation of the indoor unit, when power of the high-pressure valve is turned on, the high-pressure valve is closed to block the refrigerant flow from the gas tube to the heat exchanger.

5. The air conditioning apparatus according to claim 1, wherein the solenoid valve comprises a low-pressure valve installed in the low-pressure guide tube, and wherein the low-pressure valve is configured to generate a refrigerant flow from the heat exchanger to the gas tube.

6. The air conditioning apparatus according to claim 5, wherein during the heating operation of the indoor unit, when power of the low-pressure valve is turned on, the low-pressure valve is closed to block the refrigerant flow from the heat exchanger to the gas tube.

7. The air conditioning apparatus according to claim 1, wherein the solenoid valve comprises:
    a high-pressure valve installed in the high-pressure guide tube to generate a refrigerant flow from the gas tube to the heat exchanger; and
    a low-pressure valve installed in the low-pressure guide tube to generate a refrigerant flow from the heat exchanger to the gas tube.

8. The air conditioning apparatus according to claim 7, wherein when the indoor unit performs the cooling operation, the high-pressure valve is turned on to close the high-pressure valve so as to block the refrigerant flow from the gas tube to the heat exchanger, and the low-pressure valve is turned on to close the low-pressure valve so as to block the refrigerant flow from the heat exchanger to the gas tube.

9. The air conditioning apparatus according to claim 7, wherein when the indoor unit performs the heating operation, the high-pressure valve is turned on to open the high-pressure valve so as to allow the refrigerant to flow from the gas tube to the heat exchanger, and the low-pressure valve is turned on to open the low-pressure valve so as to allow the refrigerant to flow from the heat exchanger to the gas tube.

10. An air conditioning apparatus, comprising:
    an outdoor unit comprising a compressor and an outdoor heat exchanger and through which a refrigerant is circulated;
    an indoor unit through which a fluid is circulated; and
    a heat exchange device comprising at least one heat exchanger in which the refrigerant and the fluid are heat-exchanged with each other, wherein the at least one heat exchange device comprises:
        a high-pressure guide tube that extends from a high-pressure gas tube of the outdoor unit so as to be connected to a first side of the heat exchanger;
        a low-pressure guide tube that extends from a low-pressure gas tube of the outdoor unit so as to be combined with the high-pressure guide tube;

a liquid guide tube that extends from a liquid tube of the outdoor unit so as to be connected to a second side of the heat exchanger; and a solenoid valve installed in the high-pressure guide tube or the low-pressure guide tube to perform an opening and closing operation so as to allow the refrigerant to flow in a first direction, wherein the high-pressure gas tube and the low-pressure gas tube are connected to each other by a single gas tube, and wherein the solenoid valve comprises:

a valve body comprising a first through-hole, through which the refrigerant is introduced, a second through-hole, through which the refrigerant is discharged, and a main orifice configured to connect the first through-hole to the second through-hole;

a valve shaft disposed inside of the valve body to selectively open or close the main orifice;

a valve spring disposed inside of the valve shaft to elastically support the valve shaft; and a pilot device connected to the valve body, the pilot device being configured to perform an opening and closing operation so as to adjust an internal pressure of the valve body.

11. The air conditioning apparatus according to claim 10, wherein the pilot device comprises:

a pilot body comprising a pilot orifice configured to connect the inside of the valve body to the second through-hole;

a plunger guide disposed inside of the pilot body;

a coil member wound around an outside of the plunger guide to generate electromagnetic force;

an iron core fixed inside of the plunger guide;

a plunger disposed inside of the plunger guide so as to be installed to be movable forward and backward; and a plunger spring configured to elastically support the plunger.

12. The air conditioning apparatus according to claim 11, wherein when power is applied to the solenoid valve, current is applied to the coil member, and the coil member is excited to generate the electromagnetic force, and the plunger moves in a direction, in which the pilot orifice is opened, against the elastic force of the plunger spring.

13. The air conditioning apparatus according to claim 12, wherein when the indoor unit performs the cooling operation or the heating operation, an outlet-side pressure of the valve body is greater than an inlet-side pressure of the valve body, and refrigerant at an outlet-side of the valve body flows back into the valve body through the pilot orifice to maintain the valve shaft in a direction in which the main orifice is closed.

14. An air conditioning apparatus, comprising:

an outdoor unit comprising a compressor and an outdoor heat exchanger and through which a first fluid is circulated;

an indoor unit through which a second fluid is circulated; and a heat exchange device comprising at least one heat exchanger in which the first fluid and the second fluid are heat-exchanged with each other, wherein the at least one heat exchange device comprises:

a high-pressure guide tube that extends from a high-pressure gas tube of the outdoor unit so as to be connected to a first side of the heat exchanger;

a low-pressure guide tube that extends from a low-pressure gas tube of the outdoor unit so as to be combined with the high-pressure guide tube;

a liquid guide tube that extends from a liquid tube of the outdoor unit so as to be connected to a second side of the heat exchanger; and a high-pressure valve installed in the high-pressure guide tube to generate a flow of the first fluid from the gas tube to the heat exchanger; and a low-pressure valve installed in the low-pressure guide tube to generate a flow of the first fluid from the heat exchanger to the gas tube, wherein the high-pressure gas tube and the low-pressure gas tube are connected to each other by a single gas tube.

15. The air conditioning apparatus according to claim 14, wherein when the indoor unit performs the cooling operation, the high-pressure valve is turned on to close the high-pressure valve so as to block the flow from the gas tube to the heat exchanger, and the low-pressure valve is turned on to close the low-pressure valve so as to block the flow from the heat exchanger to the gas tube.

16. The air conditioning apparatus according to claim 14, wherein when the indoor unit performs the heating operation, the high-pressure valve is turned on to open the high-pressure valve so as to allow the flow from the gas tube to the heat exchanger, and the low-pressure valve is turned on to open the low-pressure valve so as to allow the flow from the heat exchanger to the gas tube.

17. The air conditioning apparatus according to claim 14, wherein each valve comprises:

a valve body comprising a first through-hole, through which the first fluid is introduced, a second through-hole, through which the first fluid is discharged, and a main orifice configured to connect the first through-hole to the second through-hole;

a valve shaft disposed inside of the valve body to selectively open or close the main orifice;

a valve spring disposed inside of the valve shaft to elastically support the valve shaft; and a pilot device connected to the valve body, the pilot device being configured to perform an opening and closing operation so as to adjust an internal pressure of the valve body.

18. The air conditioning apparatus according to claim 17, wherein the pilot device comprises:

a pilot body comprising a pilot orifice configured to connect the inside of the valve body to the second through-hole;

a plunger guide disposed inside of the pilot body;

a coil member wound around an outside of the plunger guide to generate electromagnetic force;

an iron core fixed inside of the plunger guide;

a plunger disposed inside of the plunger guide so as to be installed to be movable forward and backward; and a plunger spring configured to elastically support the plunger.

19. The air conditioning apparatus according to claim 18, wherein when power is applied to the valve, current is applied to the coil member, and the coil member is excited to generate the electromagnetic force, and the plunger moves in a direction, in which the pilot orifice is opened, against the elastic force of the plunger spring.

* * * * *